US007853863B2

(12) United States Patent
Sakai

(10) Patent No.: US 7,853,863 B2
(45) Date of Patent: Dec. 14, 2010

(54) METHOD FOR EXPRESSING EMOTION IN A TEXT MESSAGE

(75) Inventor: Ryutaro Sakai, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 686 days.

(21) Appl. No.: 10/266,544

(22) Filed: Oct. 7, 2002

(65) Prior Publication Data

US 2003/0110450 A1 Jun. 12, 2003

Related U.S. Application Data

(60) Provisional application No. 60/340,471, filed on Dec. 12, 2001, provisional application No. 60/353,863, filed on Jan. 31, 2002, provisional application No. 60/393,652, filed on Jul. 3, 2002.

(51) Int. Cl.
*G06N 3/00* (2006.01)

(52) U.S. Cl. .................................................. 715/200

(58) Field of Classification Search .................. 715/526, 715/500, 529, 513, 517, 523, 530, 201, 202, 715/203, 204, 200, 243, 254; 345/335, 339
See application file for complete search history.

(56) References Cited

U.S. PATENT DOCUMENTS

| 5,258,748 | A | 11/1993 | Jones et al. | |
|---|---|---|---|---|
| 5,818,447 | A | 10/1998 | Wolf et al. | 715/752 |
| 5,850,212 | A | 12/1998 | Nishibori et al. | |
| 5,860,064 | A * | 1/1999 | Henton | 704/260 |
| 6,064,383 | A | 5/2000 | Skelly | 715/758 |
| 6,405,225 | B1 | 6/2002 | Apfel et al. | 715/526 |
| 6,453,294 | B1 * | 9/2002 | Dutta et al. | 704/270.1 |
| 6,490,553 | B2 * | 12/2002 | Van Thong et al. | 704/211 |
| 6,507,643 | B1 * | 1/2003 | Groner | 379/88.14 |
| 6,622,140 | B1 * | 9/2003 | Kantrowitz | 707/5 |
| 6,784,901 | B1 * | 8/2004 | Harvey et al. | 715/757 |
| 2002/0174186 | A1 | 11/2002 | Hashimoto et al. | 709/206 |
| 2005/0156947 | A1 | 7/2005 | Sakai et al. | 345/629 |

FOREIGN PATENT DOCUMENTS

| JP | 2001/134290 | 5/2001 |
|---|---|---|
| JP | 2001/136556 A | 5/2001 |
| JP | 2001/207304 | 8/2001 |

(Continued)

OTHER PUBLICATIONS

Galanis, et al., Investigating Emotional Speech Parameters for Speech Synthesis, IEEE Oct. 1996, abstract.

(Continued)

*Primary Examiner*—Kyle R Stork

(57) ABSTRACT

In one embodiment of the present invention, while composing a textual message, a portion of the textual message is dynamically indicated as having heightened emotional value. In one embodiment, this is indicated by depressing a key on a keyboard for a period longer than a typical debounce interval. While the key remains depressed, a plurality of text parameters for the character associated with the depressed key are accessed and one of the text parameters is chosen. Animation processing is then performed upon the textual message and the indicated portion of the textual message is visually emphasized in the animated text message.

27 Claims, 29 Drawing Sheets

FOREIGN PATENT DOCUMENTS

| | | |
|---|---|---|
| JP | 2001/282417 | 10/2001 |
| JP | 2003/36234 A | 2/2003 |
| WO | WO 02/21287 A1 | 3/2002 |
| WO | WO 02/080476 A1 | 10/2002 |

OTHER PUBLICATIONS

Ohala, Ethological Theory and the Expression of Emotion in the Voice, IEEE Oct. 1996, abstract.

Takeuchi et al, Communicative Facial displays a New Conversational Modality ACM 1993, all.

Chalfonte et al. Expressive Richness: A Comparison of Speech and Text as Media for Revision ACM 1991, all.

Mohler et al., "A User Interface Framework for Kinetic Typography-enabled Messaging Applications", Proceedings of Chi: ACM Conference on Human Factors in Computing Systems, Apr. 24, 2004, pp. 1505-1508, XP002281022.

Sugarat et al, "Emotion Font" Halfbakery, Online Apr. 20-Oct. 28, 2000, XP002398080, http://www.halfbakery.com/idea/emotion_20font.

Yin Yin Wong, "Temporal Typography", Chi 96, Online Apr. 13-18, 1996, pp. 408-409, Xp002398081, http://doi.acm.org/10.1145/257089.257401.

Patent Abstracts of Japan, vol. 17, No. 194, Apr. 15, 1993.

"The Human Factor in Computers", IBM Technical Disclosure Bulletin, IBM Corporation, New York, vol. 30, No. 1, Jun. 1, 1987, pp. 478-480, XP000021724.

Notification of Transmittal of International Preliminary Examination Report; Mar. 23, 2004; PCT Application No. PCT/US02/38236.

* cited by examiner

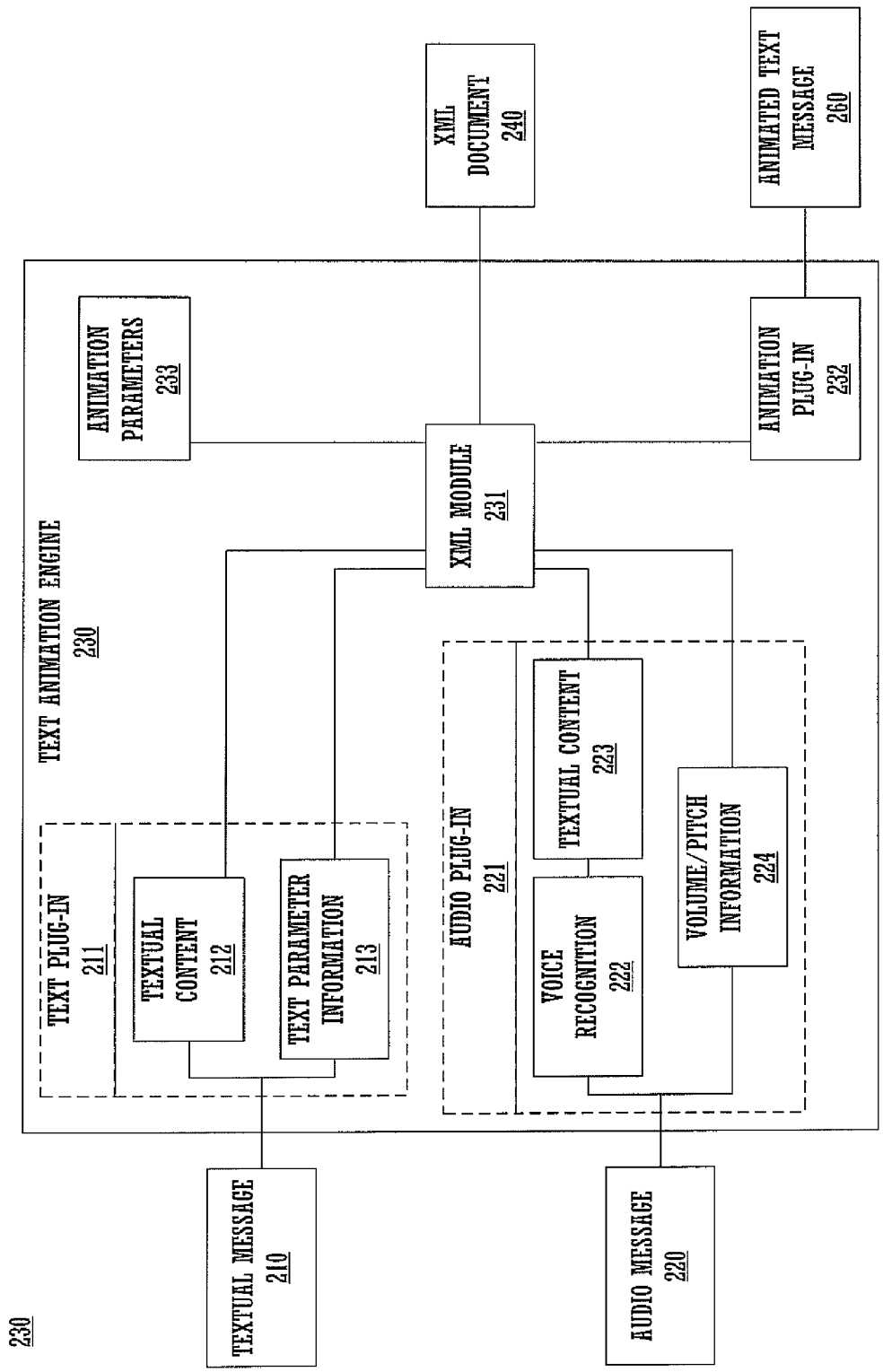

```
1000
```

```
         ┌─────────┐
         │  START  │
         └────┬────┘
              ▼
┌──────────────────────────────────────────────────┐
│ DYNAMICALLY INDICATING A PORTION OF A TEXTUAL MESSAGE │
│         HAVING GREATER EMOTIONAL VALUE           │
│                      1010                        │
└──────────────────────┬───────────────────────────┘
                       ▼
┌──────────────────────────────────────────────────┐
│  DEPRESSING A KEY ON A KEYBOARD FOR A PERIOD LONGER │
│        THAN A TYPICAL DEBOUNCE INTERVAL          │
│                     1010a                        │
└──────────────────────┬───────────────────────────┘
                       ▼
┌──────────────────────────────────────────────────┐
│   ACCESSING A PLURALITY OF TEXT PARAMETERS FOR A │
│ CHARACTER ASSOCIATED WITH THE KEY WHILE THE KEY IS │
│                    DEPRESSED                     │
│                     1010b                        │
└──────────────────────┬───────────────────────────┘
                       ▼
┌──────────────────────────────────────────────────┐
│  CHOOSING ONE OF THE PLURALITY OF TEXT PARAMETERS │
│           ASSOCIATED WITH THE KEY                │
│                     1010c                        │
└──────────────────────┬───────────────────────────┘
                       ▼
┌──────────────────────────────────────────────────┐
│ ANIMATION PROCESSING OF THE TEXTUAL MESSAGE WHEREIN │
│   THE INDICATED PORTION OF THE TEXTUAL MESSAGE IS │
│  VISUALLY EMPHASIZED IN THE ANIMATED TEXT MESSAGE │
│                      1020                        │
└──────────────────────┬───────────────────────────┘
                       ▼
                  ┌─────────┐
                  │   END   │
                  └─────────┘
```

FIGURE 10

METHOD FOR EXPRESSING EMOTION IN A TEXT MESSAGE

RELATED APPLICATIONS

The present application claims priority to USPTO provisional application No. 60/340,471 filed Dec. 12, 2001 entitled Dynamic and Emotional Motion Text with Voice Recognition, Pressure-Sensitive Keyboard Input by Ryutaro Sakai, assigned to the assignee of the present invention, and which is hereby incorporated by reference in its entirety herein.

Furthermore, the present invention claims priority to USPTO provisional application No. 60/353,863 filed Jan. 31, 2002 entitled Dynamic and Emotional Motion Text with Voice Recognition/Pressure Sensitive Keyboard Input by Ryutaro Sakai, assigned to the assignee of the present invention, and which is hereby incorporated by reference in its entirety herein.

Furthermore, the present invention claims priority to USPTO provisional application No. 60/393,652 filed Jul. 3, 2002 entitled Dynamic and Emotional Motion Text with Voice Recognition/Pressure Sensitive Keyboard Input by Ryutaro Sakai, assigned to the assignee of the present invention, and which is hereby incorporated by reference in its entirety herein.

FIELD OF THE INVENTION

The present invention relates to the field of text messaging. More specifically, embodiments of the present invention are directed to methods for expressing emotion in text message.

BACKGROUND OF THE INVENTION

Computers are widely used as communications tools which allow users to exchange information via electronic mail (e-mail), chat rooms, instant messaging, alpha-numeric paging, etc. However, many users find it ineffective at conveying emotion and emphasis, which are important components of personal communication. For example, e-mail and instant messaging are typically displayed with standardized font settings which display a uniform appearance throughout the document. In other words, the font size, color, font style (e.g., bold, italic, or underlined), etc. are uniform throughout the document. While this is adequate for conveying information, it is not as effective as human speech in conveying emphasis or emotion. In particular, the uniform appearance cannot convey certain nuances which might be apparent in personal interactions such as irony or sarcasm which rely upon voice pitch and inflection to indicate emphasis and emotion.

To overcome these shortcomings, users can manually re-format portions of the text message to indicate emphasis. For example, a user may select different fonts, colors, or font styles (e.g., bold, italic, or underlined fonts) e.g., using pull down menus. However, many users find it inconvenient to interrupt their typing in order to access pull down menus and menu commands using a mouse. Therefore, many users decline to indicate emotion or emphasis in their personal communications.

Other users have resorted to including emotional icons, also referred to as "emoticons" in their messages. Emoticons are strings of symbols which are used to compensate for the inability to convey voice inflections, facial expressions, and physical gestures in written communication. Most are meant to resemble a face (e.g., eyes, nose, and mouth) when rotated ninety degrees clockwise. However, there are no standard definitions for emoticons and therefore, the possibility for misinterpreting the writer's intent remains. Furthermore, the emoticons are static characters and are still limited in indicating the intensity or magnitude of the emphasis they are meant to convey.

Speech recognition software can also be used to create text documents. A primary goal of speech recognition software is to allow users to interact with computers using natural speech. However, it has proven difficult to realize an acceptable level of performance in recognizing the spoken command and deriving the content of that message. Therefore, the emphasis with speech recognition software developers has been directed to recognizing the spoken command more accurately. Other components of the spoken command such as voice volume and voice pitch are simply regarded as extraneous information which is not utilized. Therefore, voice to text messages are similarly ineffective in conveying emotion and emphasis to the recipient.

SUMMARY OF THE INVENTION

Accordingly, a need exists for a method of expressing a user's emotions in a text message. An additional need exists for a method which meets the above need and which is convenient to use while composing a text message. A need further exists for a method which meets the above stated needs and which is capable of expressing the intensity of the user's emotions in a text message.

Embodiments of the present invention provide a method for expressing emotions in a computer readable text message. Furthermore, embodiments of the present invention facilitate dynamically indicating emotions while composing a text message. Therefore, a user does not, for example, have to interrupt their typing in order to indicate emphasis or emotion in their message. Additionally, embodiments of the present invention facilitate providing various degrees of emphasis in the text message to express various levels of emotional intensity.

In one embodiment of the present invention, while composing a textual message, a portion of the textual message is dynamically indicated as having heightened emotional value. In one embodiment, this is indicated by depressing a key on a keyboard for a period longer than a typical debounce interval. While the key remains depressed, a plurality of text parameters for the character associated with the depressed key are accessed and one of the text parameters is chosen. Animation processing is then performed upon the textual message and the indicated portion of the textual message is visually emphasized in the animated text message. In embodiments of the present invention, the animation processing may be performed upon the textual equivalent of an audio message to create the animated text message.

The following example shows how components of the present invention may be used to indicate emotion in a text message according to one embodiment of the present invention. A user types a text message which is used as the input for a text animation engine. The user dynamically indicates the portions of the text message which have greater emotional value. The user may also determine animation parameters which are used when visually emphasizing an animated text message to indicate emotion and/or emphasis to recipient.

In other embodiments of the present invention, an audio message, such as a spoken message, is accessed. The text animation engine creates a textual equivalent of the audio message and detects portions of the audio message which are audibly louder or spoken at a different pitch than other parts of the audio message. The text animation engine indicates that these portions have greater emotional value and, using pre-set animation parameters, creates an animated text message in which the portions having greater emotional value are visually emphasized.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 3 is a block diagram of an exemplary text animation engine utilized in embodiments of the present invention.

FIG. 10 is a flowchart of a method for expressing emotion in text message in accordance with one embodiment of the present invention.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "choosing," "processing," "expressing," "de-emphasizing," "indicating," "creating," "identifying," "assigning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
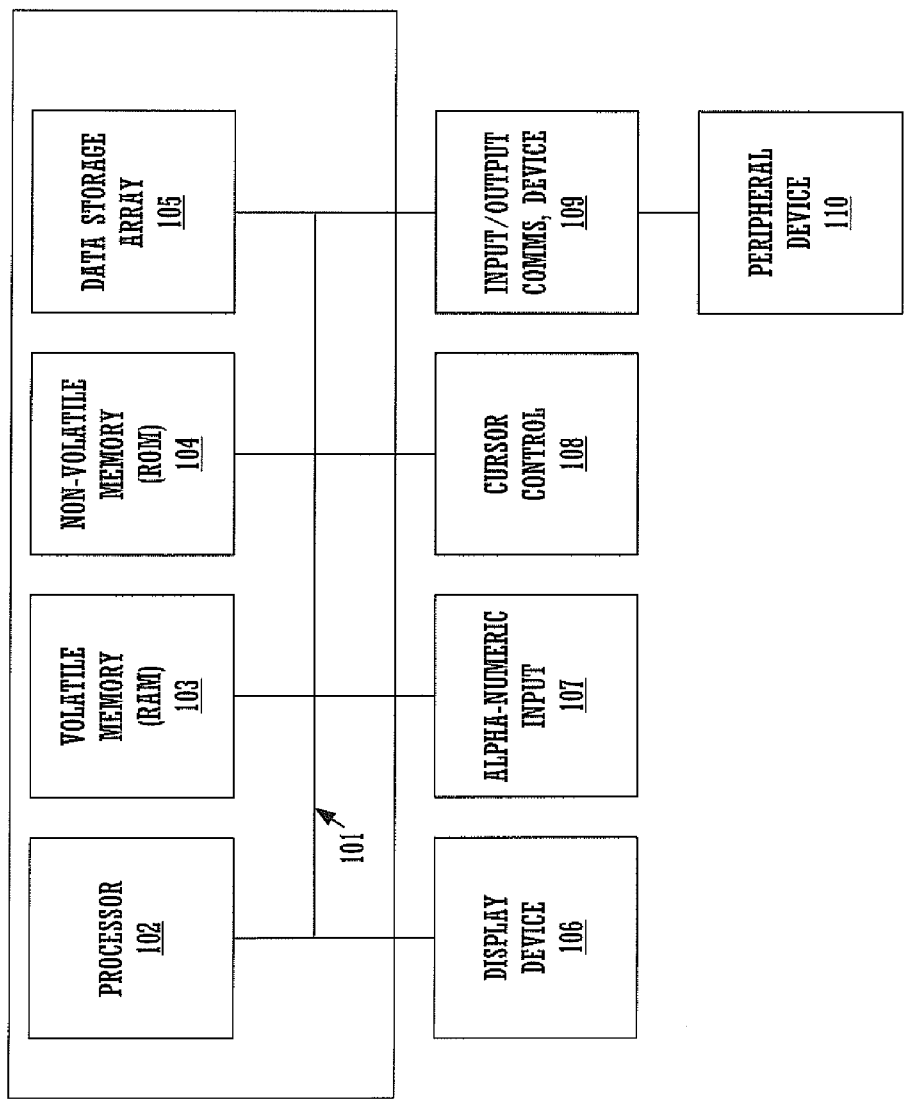
FIG. 1 is a block diagram of an exemplary computer system upon which embodiments of the present invention may be implemented.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and cellular telephone systems.

In the present embodiment, computer system 100 includes an address/data bus 101 for conveying digital information between the various components, a processor 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data. It should be noted that the software program for performing a method for expressing emotion in a text message of the present invention can be stored either in volatile memory 103, data storage device 105, or in an external storage device (not shown).

Devices which are optionally coupled to computer system 100 include a display device 106 for displaying information to a computer user, an alphanumeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed an/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., a method for expressing emotion in a text message, etc).

Figure 2:
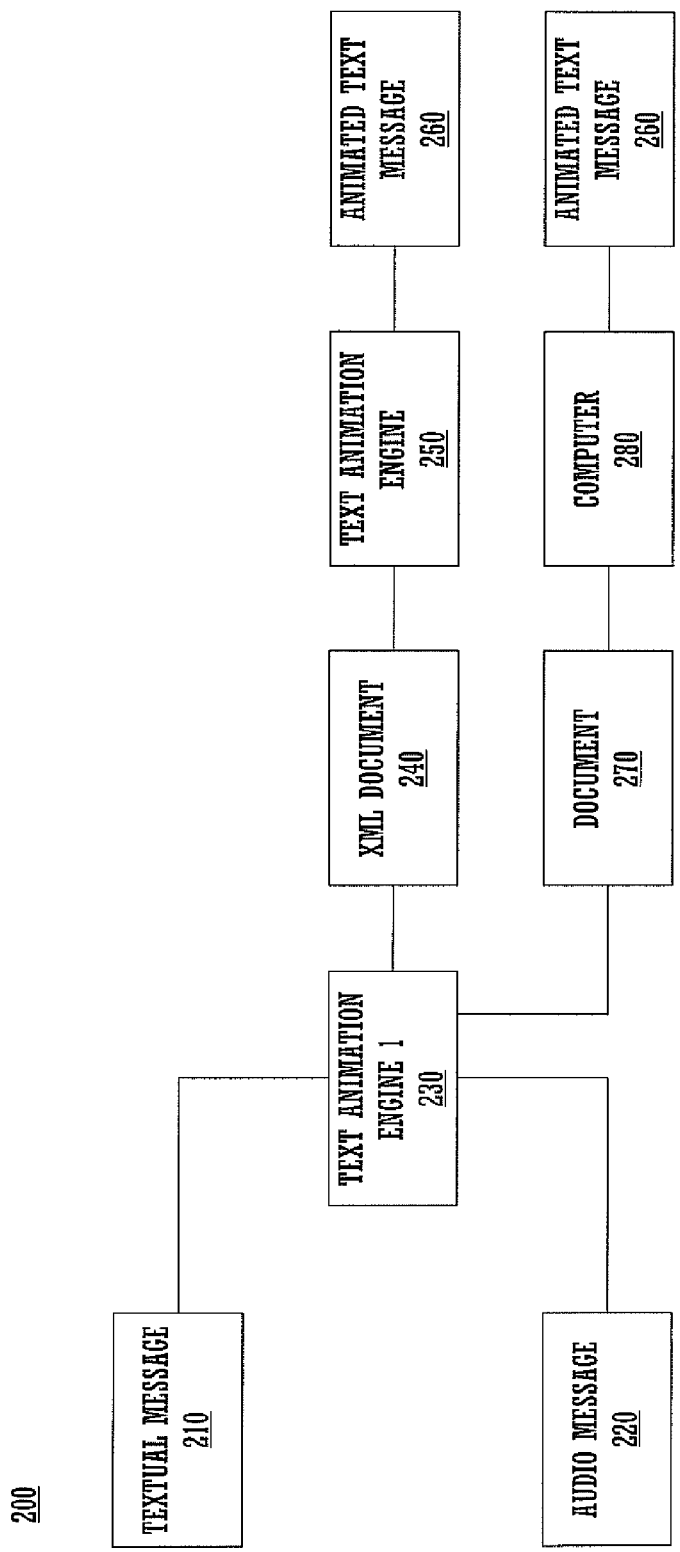
FIG. 2 is a block diagram of components used in a method for expressing emotion in a text message in accordance with embodiments of the present invention.

FIG. 2 is a block diagram of components used in a method for expressing emotion in a text message in accordance with embodiments of the present invention. In FIG. 2, a textual message 210 or an audio message 220 can be utilized as inputs to text animation engine 230. In accordance with embodiments of the present invention, these inputs are converted into animated text (e.g., animated text message 260) in which portions having greater emotional value are visually emphasized.

In one embodiment of the present invention, textual message 210 comprises written text as well as information input by the user which indicates a portion of textual message 210 which has greater emotional value to the user. In one embodiment, text animation engine 230 creates an XML document 240 which conveys the textual content of textual message 210 and indicates the portions of textual message 210 which have greater emotional value.

In another embodiment of the present invention, audio message 220 comprises a spoken message which is converted into textual equivalent by text animation engine 230. However, while the present embodiment recites a spoken message, the present invention is well suited for using other audio inputs as well such as musical lyrics, television broadcasts, etc. Additional processing is performed by text animation engine 230 to identify portions of audio message 220 which have greater emotional value. Text animation engine 230 then creates XML document 240 which conveys the textual content of audio message 220 and indicates the portions of textual message 210 which have greater emotional value. While the present embodiment recites creating an XML document, the present invention is well suited for sending a message in other formats as well in order to create animated text message 260. For example, the present invention can send document 270 formatted as a QuickTime file, Real Player file, Macromedia Flash file, etc, if a receiving computer (e.g., computer 280) is not configured with a similar text animation engine (e.g., text animation engine 250).

In embodiments of the present invention, XML document 240 may be sent to a recipient who, using another text animation engine (e.g., text animation engine 250), interprets XML document 240 to create animated text message 260. In embodiments of the present invention, animated text message 260 conveys the textual content of textual message 210 and/or audio message 220 and visually emphasizes the portions of textual message 210 and/or audio message 220 which have been indicated as having greater emotional value in animated text message 260.

Embodiments of the present invention facilitate creating text messages which convey emotion more accurately than standardized text messages. For example, e-mail and instant messaging are popular forms of communication which are typically displayed with standardized font settings. In other words, the font size, color, font style (e.g., bold, italic, or underlined), etc. are uniform throughout the document. This is adequate for conveying information, but is not as effective as human speech in conveying emphasis or emotion. While a user may choose to manually reformat the message, most users find the steps for manually reformatting a message inconvenient and therefore use the standardized font settings.

The present invention differentiates the portions of a message which a user indicates as having greater emotional value and visually emphasizes those portions in an animated text message. Thus, embodiments of the present invention allow a user to quickly and accurately convey the emphasis and emotion of a spoken message in a text message. Furthermore, embodiments of the present invention do not require any special programming skills on the part of the user in order to create the animated text message. Additionally, embodiments of the present invention allow a user to express varying levels of emphasis in the animated text message.

FIG. 3 is a block diagram of an exemplary text animation engine 230 which may be utilized in embodiments of the present invention. Data from textual message 210 is received into text plug-in 211. In embodiments of the present invention, textual message 210 comprises textual content 212 and text parameter information 213. Textual content 212 is the literal transcription of textual message 210. Text parameter information 213 is additional information, dynamically provided by the user, which indicates the portions of textual message 210 that have greater emotional value. There are a variety of methods for a user to dynamically indicate the portions of textual message 210 which have greater emotional value and which are described in greater detail below. Additionally, the user may dynamically provide information which indicates portions of textual message 210 that have less emotional value and may be visually de-emphasized in embodiments of the present invention.

Textual content 212 and text parameter information 213 are received by XML module 231. XML is a markup language which describes data using appended tags to define the attributes of sections, also referred to as "elements", of data. The XML attributes provide information that is not part of the data, but may be important to the software attempting to manipulate the data. XML module 231 is used to create XML document 240 using textual content 212 and text parameter information 213.

In embodiments of the present invention, XML document 240 utilizes the Scalable Vector Graphics (SVG) compliant markup language. SVG describes two dimensional images using XML compliant tags that define image attributes, which allows developers to create interactive and animated images. SVG can display two dimensional. vector graphics shapes, bitmap graphics, and text. While SVG is limited in terms of the animated effects it can convey, it has the advantage of generally using smaller file sizes than bitmap equivalents and is therefore well suited for use with portable wireless devices such as cellular phones and PDAs that are restricted by limited bandwidth and memory resources.

In one embodiment of the present invention, XML module 231 uses text parameter information 213 to identify the sections of textual content 212 which have greater emotional value. XML module 231 appends different XML attributes to each section of XML document 240 which are used to identify portions of textual message 210 having greater emotional value. The appended attributes can convey information used by text animation engine 250 to render those portions differently than other portions in animated text message 260 to give them visual emphasis.

For example, a user sending the message, "I will see you tomorrow," may wish to emphasize the word "you." While composing textual message 210, the user indicates that the word "you" has greater emotional value than the rest of the words in the sentence. Textual content 212 is this case comprises "I will see you tomorrow," and text parameter information 213 records that the user has indicated that the word "you" has greater emotional value to the user. Using this information, XML module 231 creates XML document 240. In XML document 240, the phrase "I will see," is described as a first element in document 240 having a first set of attributes. The word "you" is described as a second element in document 240 having a different set of attributes than the first element in the document. Finally, the word "tomorrow" is described in the document as a third element which has the same attributes as the first element.

The attributes assigned to the various sections of XML document 240 are derived from animation parameters 233. In embodiments of the present invention, animation parameters 233 are either default values, or are set by the user and describe animation effects and other parameters of animated text message 260. For example, the user can define default parameters for text in animated text message 260 which is not visually emphasized because it was not identified as having greater emotional value in textual message 210. The user can also define default parameters for portions of animated text message 260 which are visually emphasized because they were identified in textual message 210 as having greater emotional value.

There are a variety of parameters which can be defined by a user in embodiments of the present invention. For example, the user can define a background for animated text message 260. This can include, but is not limited to, background color, background images, and animated background images. The user can also define font parameters for animated text message 260. Additionally, the user can set different default font parameters for the portions of animated text message 260 which are to be visually emphasized. Font parameters can include, but are not limited to, font size, font color, font style (e.g., bold, italic, underlined, etc.), and font opacity.

Font opacity refers to the ratio between a background color and the color of an item in the foreground such as text. If the text is selected to have 100% opacity, then none of the background color shows through the text. If the text is selected to have 0% opacity, then all of the background color is shows through the text and makes the text indistinguishable from the background. Therefore, a font with 100% opacity can be more easily distinguished from its background than a font with 50% opacity and could be used to indicate an emphasized portion of a message. In embodiments of the present invention, a user can set a default level of, for example, 80% opacity for the textual message as a whole and 100% opacity for portions of the animated text message which should be visually emphasized.

Animation parameters 233 may also comprise animation parameters for animated text message 260 which are used to simulate motion of textual message 210 in animated text message 260. This may include, but is not limited to: scrolling, text fade-in, text fade-out, flashing text, etc. Furthermore, the user may select different default parameters for portions of textual message which have been indicated as having greater emotional value. In so doing, the user can designate portions of animated text message 260 which are to be visually emphasized. Using the above example, the word "you" is displayed using different animation effects than the rest of the sentence in the message, "I will see you tomorrow." The user can designate animation parameters which give the word "you" the appearance of motion, while the rest of the words in the sentence remain stationary.

In embodiments of the present invention, animation parameters 233 may also comprise settings which de-emphasize in animated text message 260, the portions of textual message 210 which were not indicated as having greater emotional value. Using the above example, the word "you" may continue to be displayed in animated text message 260 while the other words in the sentence (e.g., "I", "will", "see", and "tomorrow") fade out (e.g., by gradually decreasing their opacity level). In another implementation, the word "you" is displayed with 100% opacity to contrast it more effectively from its background while the other words in the sentence, which do not have greater emotional value, are displayed with a 80% opacity level so that they are harder to distinguish from the background and thus visually de-emphasized.

The user may also identify a portion of textual message 210 which is visually de-emphasized in animated text message 260. For example, in the message, "I will see you tomorrow," the user may indicate that the word "will" has less emotional value. This information is recorded in text parameter information 213 and used by XML module 231 to assign a different set of attributes to the word "will" in XML document 240. In embodiments of the present invention, a user may preview the appearance of animated text message 260 before sending XML document 240 to a recipient. This allows the user to, for example, change the animation effects before sending the message.

Figure 4A:
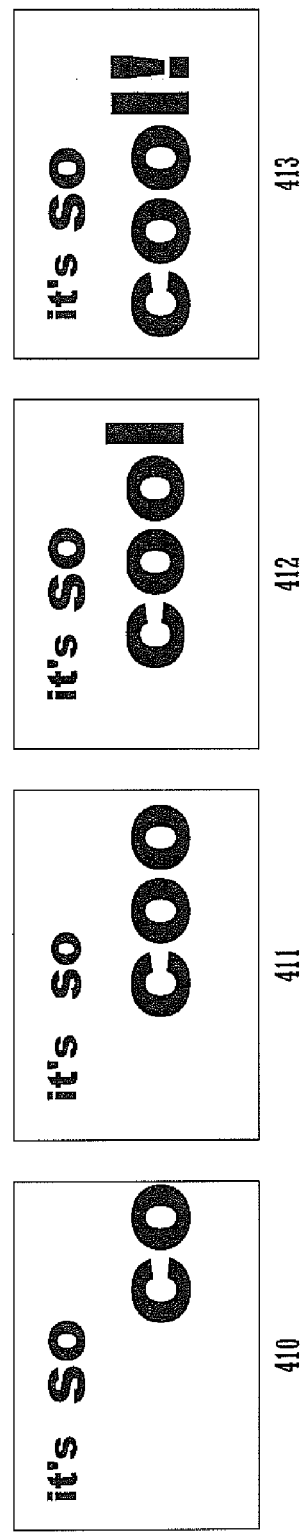
FIGS. 4A, 4B, and 4C show sequences of text messages that have been animated in accordance with embodiments of the present invention.
Figure 4B:
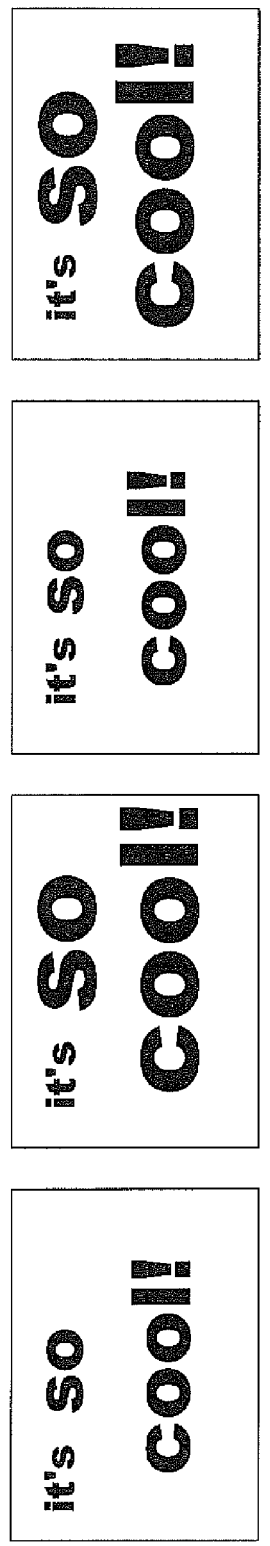
Figure 4C:
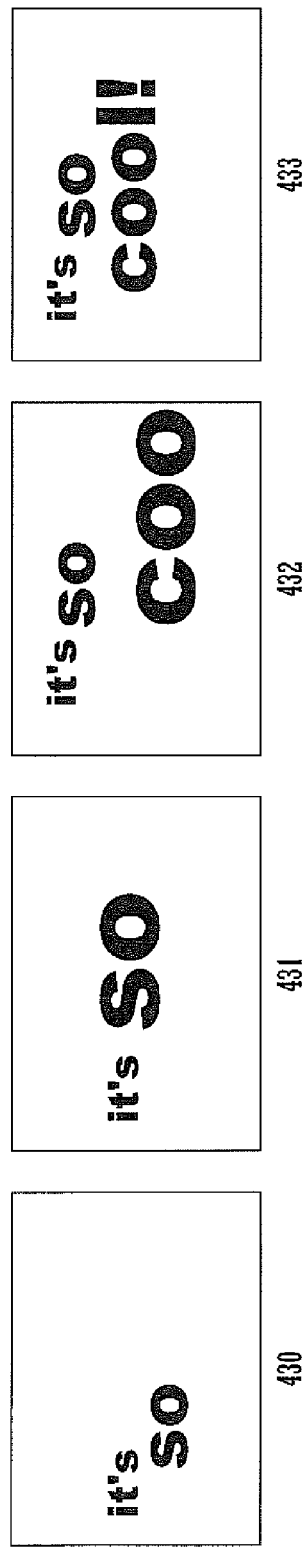

FIGS. 4A, 4B, and 4C show sequences of exemplary screen shots displaying text messages that have been animated in accordance with embodiments of the present invention. In FIG. 4A, a sequence of exemplary screen shots is shown in which one of the words in the message, "it's so cool" appears to scroll into the display from the right side. As shown in FIG. 4A, the word "so" is visually emphasized by displaying it in a larger font size than the word "it's". Similarly, the word "cool" is visually emphasized by displaying it in a larger font size than the other words in the message. This is a result of these indicating that these words have heightened emotional value in text parameter information 213. As shown in FIG. 4A, the use of varying font sizes indicates varying degrees of emphasis.

In FIG. 4B, the words "so" and "cool" alternate between two different font sizes which gives them the appearance of flashing. For example, in screen shots 420 and 422, the words "so" and "cool" are visually emphasized by displaying them with a larger font size than the word "it's." In screen shots 421 and 423, the words "so" and "cool" are displayed in an even larger font size and therefore convey the appearance of flashing to a user viewing the message.

In screen shot 430 of FIG. 4C, the words "it's" and "so" are displayed in a first portion of the screen. In screen shot 431, the word "so" is visually emphasized by displaying it with a larger font size than was used in screen shot 430. In screen shot 432, the words "it's" and "so" are displayed in a different portion of the screen and the word "so" is displayed with the font size in which it was originally displayed. Furthermore, in screen shot 432, the word "cool" is displayed as if it is scrolling in from the right side of the display and in a larger font size than the words "it's" and "so." Finally, in screen shot 433, the words "cool" is completely displayed.

Figure 5A:
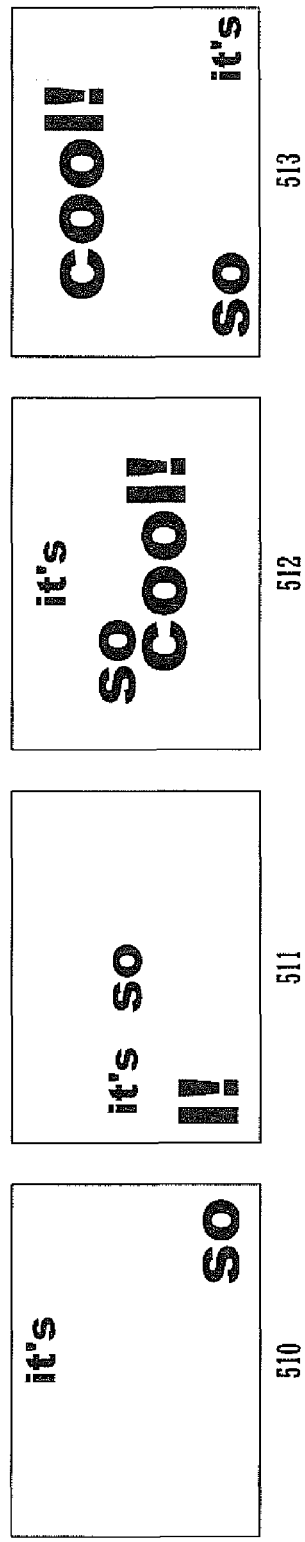
FIGS. 5A, 5B, and 5C show additional sequences of text messages that have been animated in accordance with embodiments of the present invention.
Figure 5B:
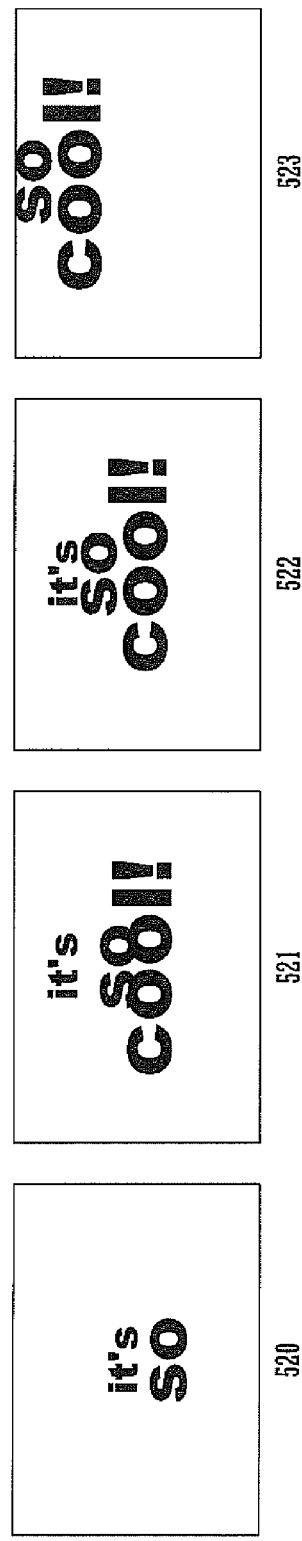
Figure 5C:
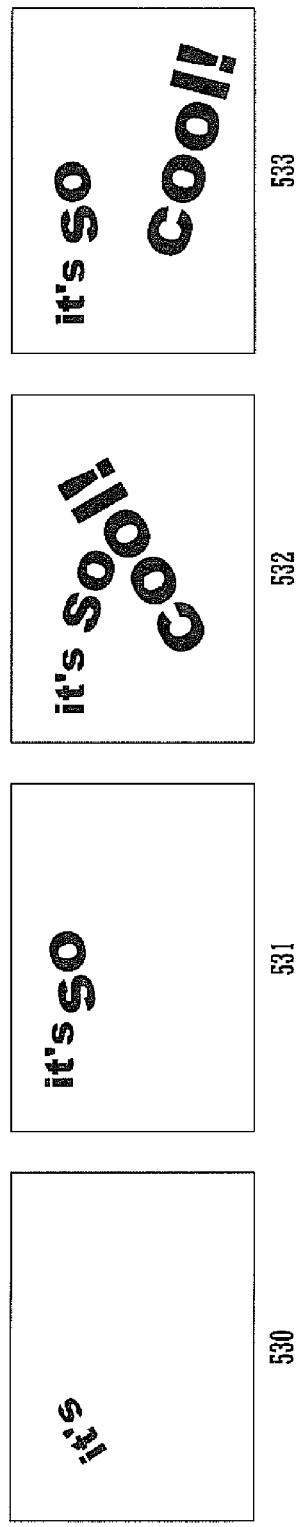

FIGS. 5A, 5B, and 5C show additional sequences of text messages that have been animated in accordance with embodiments of the present invention. In screen shot 510 of FIG. 5A, the words "it's" and "so" are displayed in separate portions of the screen. Furthermore, the word "so" is visually emphasized by displaying it with a larger font size than the word "it's." In screen shot 511, the words "it's" and "so" are displayed in different portions of the screen than the portions in which they were displayed in screen shot 510. In screen shot 513, the phrase, "it's so cool" is displayed with the word "cool" visually emphasized by displaying it with a larger font size than the words "it's" and "so." Furthermore, the words "it's" and "so" are displayed in different portions of the screen than in screen shots 510 and 511, thus giving the appearance of random motion. Finally, in screen shot 513, the words "it's," "so," and "cool" are displayed in different portions of the screen than in the preceding three screen shots, thus furthering the appearance of random motion of the words. Additionally, the words "so" and "cool" are visually emphasized by displaying then with larger font sizes than the word "it's."

In screen shot 520 of FIG. 5B, the words "it's" and "so" are displayed with the word "so" visually emphasized by displaying it with a larger font size than the word "it's." In screen shot 521, the word "cool" is also displayed and visually emphasized by displaying it with a larger font size than the words "it's" and "so." In screen shot 522, the words "it's," "so," and "cool" are displayed in different portions of the screen than in screen shots 520 and 521 and give the appearance of the phrase scrolling to the top of the display. Finally, in screen shot 523, a portion of the word "so" remains visible on the display as well as the word "cool."

In screen shot 530 of FIG. 5C, the word "it's" is displayed upon the screen. In screen shot 531, the word "so" is added and visually emphasized by displaying it with a larger font size than the word "it's." In screen shot 532, the word "cool" is displayed and visually emphasized by displaying it with a larger font size than the words "it's" and "so." Finally in screen shot 533, the words "so" and "cool" are displayed having different orientations in relation to the display than in the preceding screen shots. This gives further visual emphasis to these words because of their implied motion in comparison to the word "its."

Thus, various animation effects can be used to visually emphasize a portion of a textual message having heightened emotional value in embodiments of the present invention. While the present invention cites the above examples of animation effects, it is understood that the present invention is well suited for utilizing other visual processing effects to visually emphasize a portion of a textual message.

Figure 6:
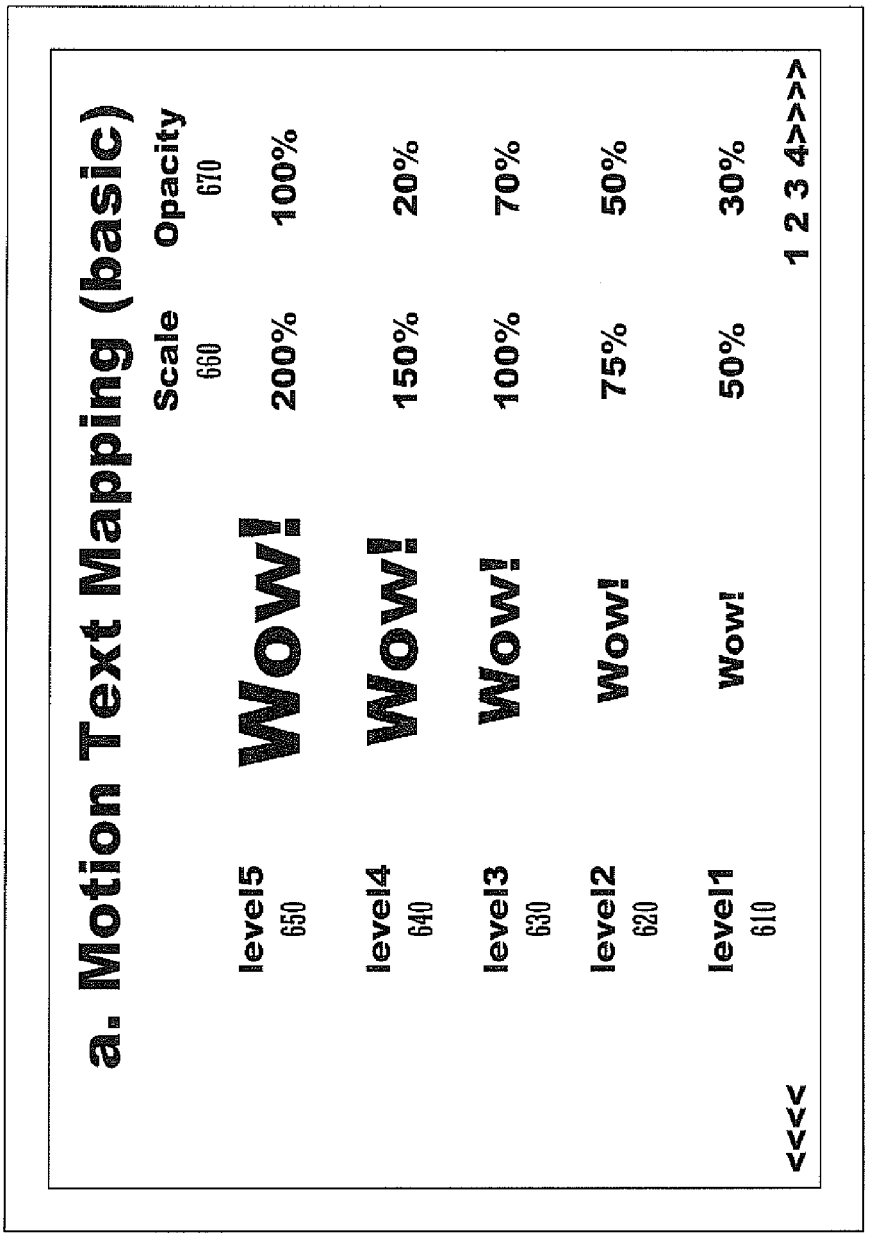
FIG. 6 shows exemplary text appearances having font parameters that are adjusted in accordance with embodiments of the present invention.

FIG. 6 shows exemplary text appearances having font parameters that are adjusted in accordance with embodiments of the present invention. In FIG. 6, five levels visual emphasis are displayed (e.g., levels 610, 620, 630, 640, and 650 of FIG. 6). Each level of emphasis displays a word in a different font size. For example, level 3 (630) displays a word at a scale of 100%, while level 5 (650) displays a word at a scale of 200%. When a user indicates a portion of a textual message that has heightened emotional value (e.g., by supplying text parameter information 213), that portion of the textual message may be displayed using the text parameters of level 5. Additionally, each of the levels of visual emphasis shown is associated with an opacity parameter. Font opacity refers to the ratio between a background color and the color of an item in the foreground such as text. In the embodiments of FIG. 6, text displayed using the level 5 parameters is displayed with 100% opacity. This means that words displayed with the level 5 parameters can be more easily distinguished from their background than words displayed with the level 3 parameters which are displayed with a 70% opacity and therefore are harder to distinguish from the background color.

For example, level 3 (e.g., level 630 of FIG. 6) may be used as the default font parameter for portions of animated text message 260 which are not to be visually emphasized. Words which have been indicated as having heightened emotional value may be displayed using the levels 4 and 5 parameters (e.g., levels 640 and 650 respectively) to convey a greater degrees of emphasis than level 3 in animated text message 260. Additionally, words may be displayed using levels 2 and 1 parameters (e.g., levels 620 and 610 respectively) to convey less emphasis than level 3. Additionally, different animation parameters may be automatically associated with the font parameters to indicate greater emphasis. For example, a word having level 5 parameters may be displayed as flashing through various font sizes (e.g., in a manner similar to screen shots 420, 421, 422, and 423 of FIG. 4B), while a word having level 3 parameters may be displayed as static or without any additional animation effects.

Figure 7A:
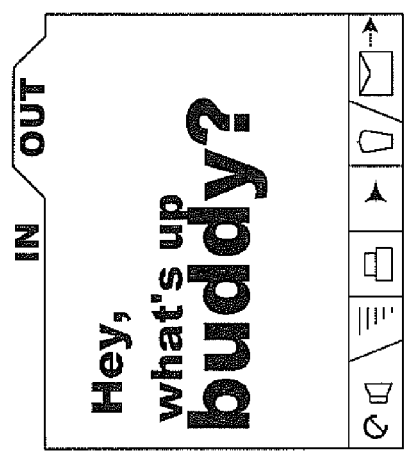
FIGS. 7A, and 7B are exemplary graphical user interfaces for a handheld wireless device showing an animated text message in accordance with embodiments of the present invention.
Figure 7B:
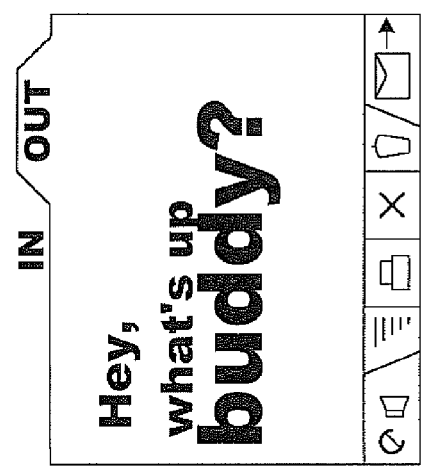

FIGS. 7A and 7B are exemplary graphical user interfaces showing an animated text message (e.g., animated text message 260 of FIG. 2) in accordance with embodiments of the present invention. In accordance with embodiments of the present invention, FIGS. 7A, and 7B may be a preview of animated text message 260 which is being viewed by the creator of textual message 210, or may be the animated text message 260 which is being viewed by the recipient of the message.

In FIG. 7A, the message "Hey, what up buddy?" is displayed. In accordance with embodiments of the present invention, the user has indicated that the word "buddy" has greater emotional value when creating textual message 210. Thus, in FIG. 7A, the word "buddy" is displayed in animated text message 260 with a larger font size than the rest of the sentence in order to give it visual emphasis.

In FIG. 7B, additional animation processing has been performed upon the message "Hey, what up buddy?" Portions of animated text message 260 are displayed in different areas of graphical user interface 700 to simulate motion of the text. In embodiments of the present invention, different animation parameters can be designated for the emphasized portions of animated text message 260 (e.g., the word "buddy" in FIG. 7B) to indicate greater emotional value. For example, the word "buddy" may continue moving in various portions of graphical user interface 700 while the other words in the message remain stationary.

Figure 8A:
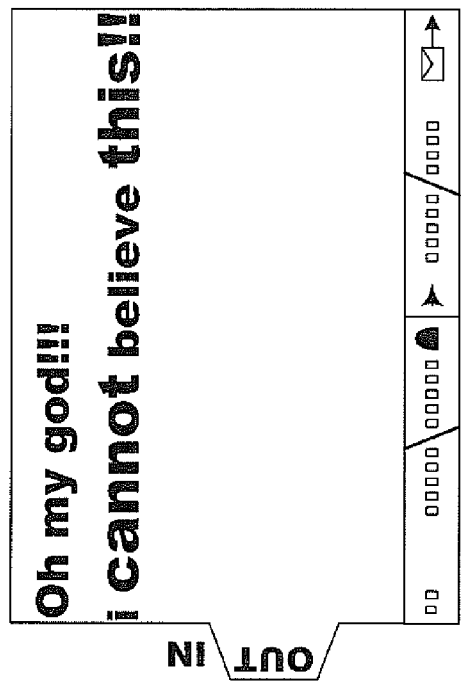
FIGS. 8A, 8B, and 8C are exemplary graphical user interfaces showing an animated text message in accordance with embodiments of the present invention.
Figure 8B:
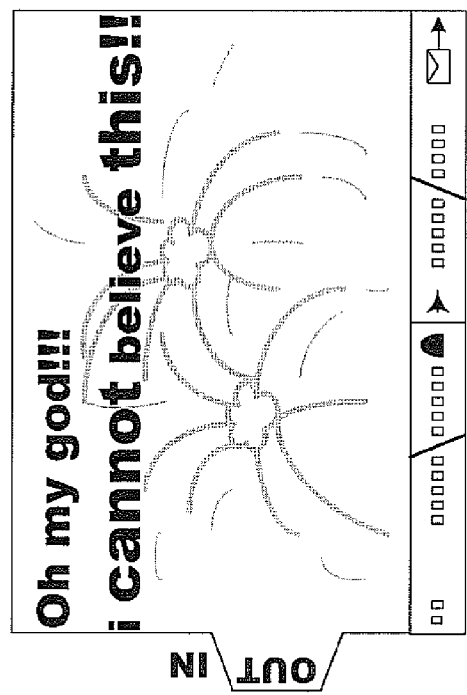
Figure 8C:
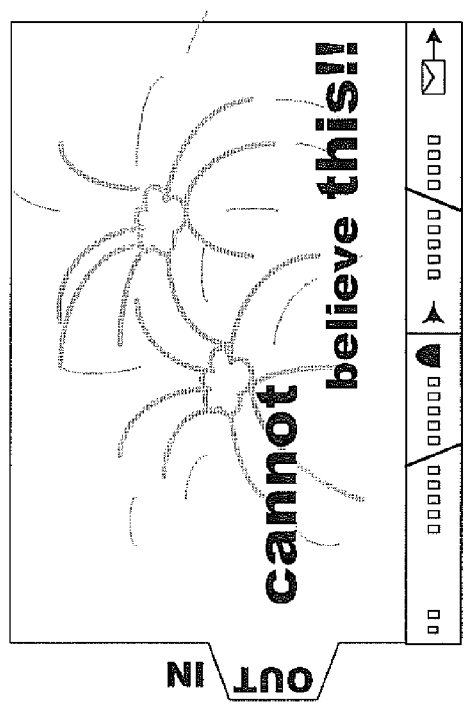

FIGS. 8A, 8B, and 8C are exemplary graphical user interfaces showing an animated text message (e.g., animated text message 260 of FIG. 2) in accordance with embodiments of the present invention. According to embodiments of the present invention, FIGS. 8A, 8B, and 8C may be a preview of animated text message 260 which is being viewed by the creator of textual message 210, or may be the animated text message 260 which is being viewed by the recipient of the message.

In FIG. 8A, the message "Oh my god!!! I cannot believe this!!" is displayed. In accordance with embodiments of the present invention, the user has indicated that the words "god," "cannot," and "this" have greater emotional value when creating textual message 210. Thus, in FIG. 8A, the word "believe" is displayed in a larger font size than the words "Oh," and "my" to convey greater emphasis. Additionally, the words "god," "cannot," and "this" are displayed in animated text message 260 with the largest font size to indicate that these words have the greatest amount of emotional value In FIG. 8B, additional animation processing has been performed upon the message, "Oh my god!!! I cannot believe this!!" Additionally, a background image is now displayed. In embodiments of the present invention, a user can designate background images (e.g., pictures or animated images) to be displayed in animated text message 260.

In FIG. 8C, portions of animated text message 260 are displayed in different areas of graphical user interface 800 to simulate motion of the text. Additionally, animation processing has been performed so that portions of the original message are no longer displayed.

Referring again to FIG. 3, data from an audio message 220 can also be used as an input to text animation engine 230 using audio plug-in 221. Audio plug-in 221 may include a voice recognition component 222 for creating textual content 223. Textual content 223 is a literal transcription of audio message 220. There are a variety of commercially available voice recognition software systems which can be used with embodiments of the present invention to convert audio message 220 into textual content 223. Thus, in accordance with embodiments of the present invention, textual content 223 is the textual equivalent of audio message 220.

Additionally, in accordance with embodiments of the present invention, volume/pitch information 224 about audio message 220 is captured by audio plug-in 221. When a person is speaking, emotional value or emphasis is often conveyed by the volume at which a particular word is spoken, or by the pitch at which a particular word is spoken. For example, a user will often speak a word having greater emotional value slightly louder in order to emphasize that word. Alternatively, a speaker may say a word or phrase at a slightly higher or lower pitch in order to indicate emphasis. While the present embodiment recites utilizing volume and/or pitch information in order to indicate portions of audio message 220 having greater emotional value, the present invention is well suited to utilize other information for indicating a portion of audio message 220 having greater emotional value.

In one embodiment of the present invention, audio plug-in 221 utilizes spectrum analysis software (not shown) for capturing volume/pitch information 224. There are a variety of software implemented spectrum analyzers currently utilized in multi-media computer applications. A typical spectrum analyzer divides an audio signal into defined frequency ranges and displays the relative signal strength of each of those frequency ranges. Audio plug-in 221 can utilize spectrum analysis software to detect portions of audio message 220 which are emphasized by a speaker and indicate that those portions have greater emotional value.

For example, when a user wants to emphasize a portion of a spoken message, they usually speak that portion louder than other portions of the message. The spectrum analysis software can be configured to automatically detect when a portion of an audio message is significantly louder than other parts of the message and indicate in volume/pitch information 224 that that portion has greater emotional value than another part of audio message 220.

Alternatively, when a user wants to emphasize a portion of a spoken message, they may speak that portion at a higher or lower pitch than other portions of the message. Audio plug-in 221 can be provided with pre-set parameters to detect the portions of the message which are spoken at higher or lower pitch than other portions of audio message 220 and indicate in volume/pitch information 224 that that portion has greater emotional value than another part of audio message 220.

Figure 9:
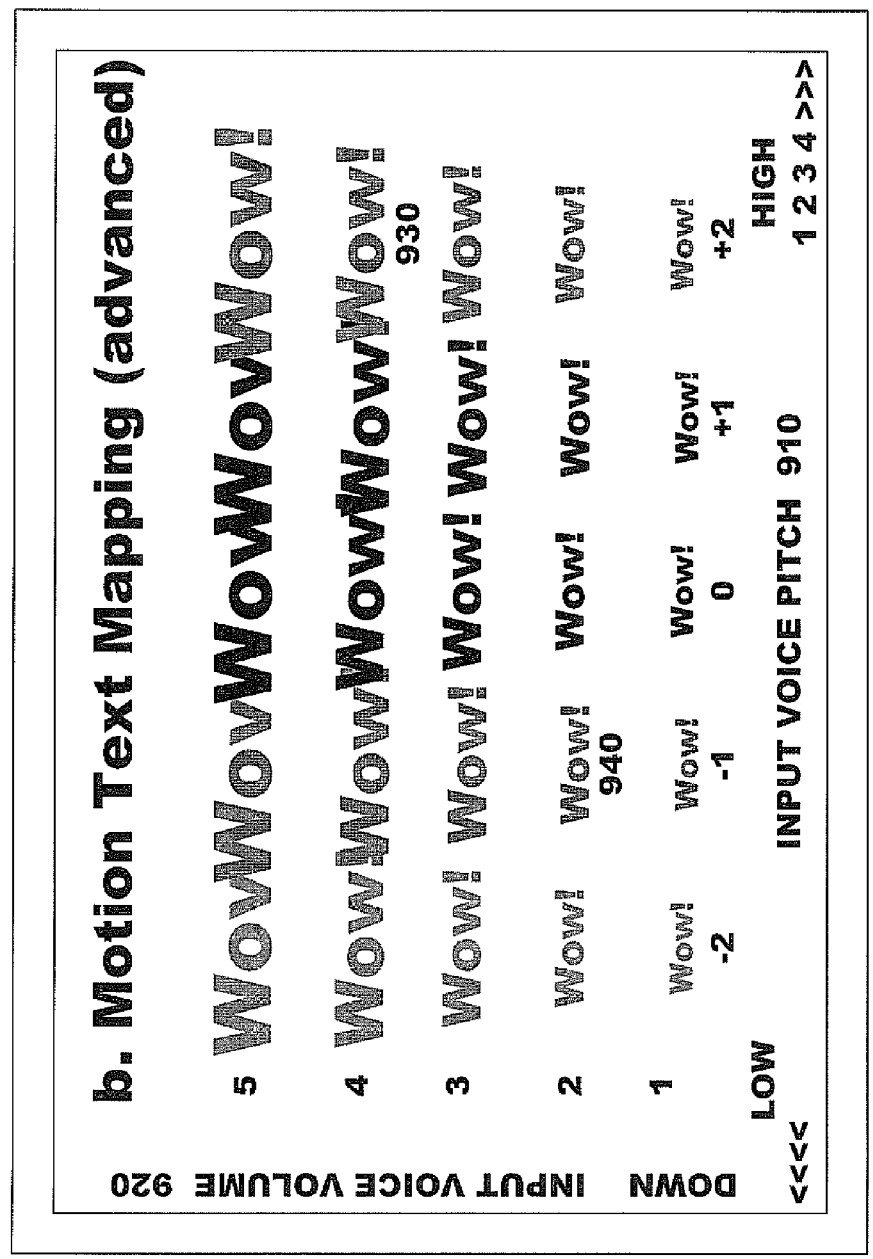
FIG. 9 shows exemplary text appearances having font parameters based upon voice pitch and volume in accordance with embodiments of the present invention.

FIG. 9 shows exemplary text appearances having font parameters based upon voice pitch and volume in accordance with embodiments of the present invention. In embodiments of the present invention, input voice pitch 910 and input voice volume 920 are used as parameters for indicating a portion of audio message 220 which has greater emotional value. Input voice pitch 910 is displayed in a manner comparable to the display of frequency ranges used by spectrum analyzers while input voice volume 920 is displayed in a manner comparable to the display of relative signal strength.

FIG. 9 shows how text in animated text message 260 will be displayed as the user's voice pitch and volume vary. For example, word 930 is spoken at a pitch of +2 and a volume of 4 and is displayed with different font parameters than word 940 which is spoken at a pitch of −1 and a volume of 2. In embodiments of the present invention, animation parameters can also be assigned to a particular word based upon the input voice pitch and input voice volume. For example, word 930 may be displayed to simulate motion while word 940 remains stationary to give it greater visual emphasis.

Referring still to FIG. 3, animation plug-in 232 is for converting data from XML module 231 into animated text message 260. For example, a user receives XML document 240 as input into a second text animation engine on their computer (e.g., text animation engine 250 of FIG. 2). XML module 231 translates XML document 240 into instructions to animation plug-in 232, causing it to create animated text message 260. In one embodiment, XML module 231 translates XML document into a format compatible with animation plug-in 232. However, in other embodiments of the present invention, re-formatting of XML document 240 into a compatible format is performed by animation plug-in 232, or by an intermediary module (not shown). In accordance with embodiments of the present invention, a plurality of animation formats can be supported by a plurality of animation plug-ins including, but not limited to, Macromedia Flash, Macromedia Director, Java, JavaScript, Adobe Aftereffects, Adobe Premier, C++, etc.

In accordance with embodiments of the present invention, text animation engine 230 may exist as a stand alone application, or as middleware for other applications. For example, the present invention can be used with existing music player applications to display animated text of music lyrics while the music is being played. In another implementation, the present invention can be used to display animated text in conjunction with television broadcasts such as sports events, or children's programming. In embodiments of the present invention, an audio file may be kept of audio message 220 which can be sent at the same time XML document 240 is sent. This allows, for example, a recipient to concurrently listen to audio message 220 while viewing animated text message 260. This could be used, for example, with voice messaging systems to provide an audio component to animated text message 260.

FIG. 10 is a flowchart of a computer implemented method for expressing emotion in text message in accordance with one embodiment of the present invention. Referring to FIG. 2 and to step 1010 of FIG. 10, a portion a textual message having greater emotional value is dynamically indicated. In embodiments of the present invention, a user creating a textual message (e.g., textual message 210 of FIG. 2) dynamically indicates a portion of the textual message having greater emotional value. Steps 1010a, 1010b, and 1010c discuss in greater detail, a method for dynamically indicating a portion of a textual message in accordance with embodiments of the present invention.

In step 1010a of FIG. 10, a key on a keyboard is depressed for a period longer than a typical debounce interval. "Bouncing" is a term used to describe what happens when the switch for a keyboard key is closed or opened. Instead of a single, square edge signal being generated, a switch change typically consists of several rapid on-off cycles which are a result of the electrical signal "bouncing" during the transition of the switch. The signal actually received by the keyboard's micro-controller input pin looks like a series of spikes and can cause the keyboard micro-controller to interpret the multiple spikes as multiple keyboard requests.

To prevent having the keyboard micro-controller from interpreting the signal bounce as a rapid series of button press operations, a "debounce" routine may be incorporated into the keyboard micro-controller which causes it to wait a given period before accepting another keyboard request. For example, a typical series of signal spikes may occur for approximately 10 milli-seconds after a key is pressed. The debounce routine may cause the keyboard micro-controller to wait for approximately 20 milli-seconds after a key press before accepting another keyboard request.

In step 1010b of FIG. 10, a plurality of text parameters for a character, associated with the key are accessed while the key is depressed. In one embodiment of the present invention, while a key is held down, the displayed letter cycles through a series of different text parameters, such as a plurality of font sizes. For example, if textual message 210 is being displayed with a font size of 10, holding down a key causes the letter associated with the depressed key to cycle between font size 12, font size 14, font size 16, and font size 10 again. Additionally, in embodiments of the present invention, while the key remains depressed, the font opacity will cycle through a series of values while the font size is being cycled. While the key remains depressed, the associated letter will continue to cycle through the different font sizes and/or opacity values until one is chosen (e.g., by releasing the key when the desired font size and/or opacity is displayed). While the present embodiment specifically recites font sizes and opacity, the present invention is well suited for displaying a variety of font characteristics which can be used to identify a portion of a textual message having greater emotional value. In other embodiments of the present invention, while the key remains depressed the associated letter may cycle through a plurality of fonts, colors, font styles, etc.

In step 1010c FIG. 10, one of the plurality of text parameters associated with the character is chosen. Using the above example, a user can select a particular font size by releasing the key when the letter associated with the key is displayed in the desired font size. Thus, if the user wants to select a font size of 14 for the letter being displayed, the user releases the depressed key when the letter is displayed in the appropriate font size. In one embodiment, the user can change the font of a letter of a word and the rest of the letters in the word will be displayed in the same font. The next word will then be displayed in the default font size unless a different font is selected by the user. In another embodiment, when the font of a letter is changed, the words which follow are displayed in the newly selected font size until a new font size is selected. In so doing, the user is indicating a portion of a textual message (e.g., textual message 210 of FIG. 2) which has greater emotional value.

This method for accessing a plurality of text parameters is advantageous because a user does not have to remove their hands from the keyboard while composing a textual message. In prior art methods a user might be required to utilize a mouse in order to access the text parameters via pull down menus. Many users find this an inconvenient interruption of their typing which slows them down while they switch between the keyboard and the mouse. The present invention allows the user to keep their hands on the keyboard and their eyes on the display. As a result, less time is lost switching between the keyboard and the mouse.

Referring to FIG. 3 and to step 1020 of FIG. 10, animation processing of the textual message (e.g., textual message 210) is performed wherein the portion of the textual message indicated in steps 1010a, 1010b, and 1010c is visually emphasized in an animated text message (e.g., animated text 260 of FIG. 2). Animation plug-in 232 performs animation processing upon data from XML module 231 to create animated text message 260. In embodiments of the present invention, the attributes of the various sections of XML document 240 describe different animation effects for portions which are to be visually emphasized in animated text message 260 in order to indicate greater emotional value.

Figure 11:
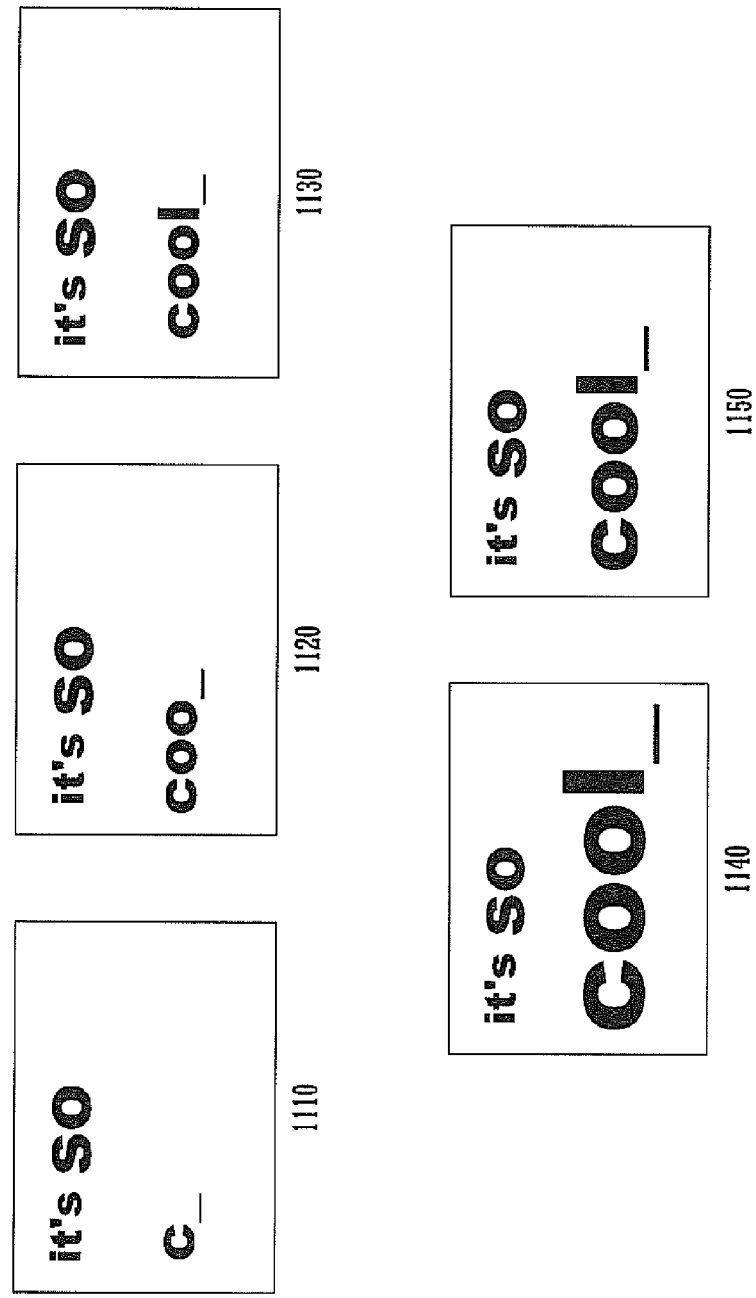
FIG. 11 shows one method for emphasizing a portion of a text message in accordance with embodiments of the present invention.

FIG. 11 shows one method for emphasizing a portion of a text message in accordance with embodiments of the present invention. In exemplary screen shot 1110 of FIG. 11, a user is typing the phrase "it's so cool." As the use completes typing the word "cool" in screen shots 1120 and 1130, they continue depressing the "L" key on their keyboard. While the key remains depressed (e.g., screen shot 1140 of FIG. 11), the font size of the word "cool" becomes larger and the opacity value of the font becomes larger. In screen shot 1150, as the "L" key remains depressed, the word "cool" is displayed in a smaller font size and with a lesser opacity value. When the word is displayed with the desired font size and opacity value, the user can release the "L" key and continue typing their message. In so doing, the user has dynamically indicated that the word "cool" has heightened emotional value and will thus be visually emphasized in the textual message.

Figure 12:
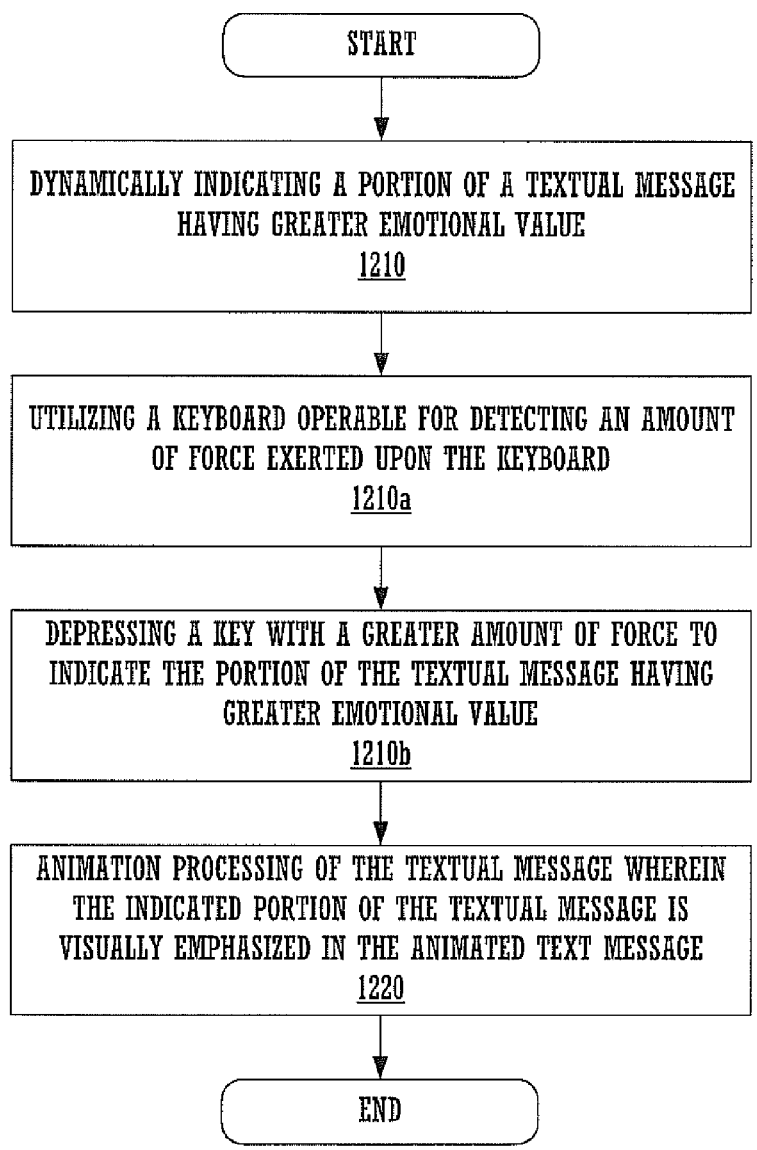
FIG. 12 is a flowchart of a method for expressing emotion in text message in accordance with one embodiment of the present invention.

FIG. 12 is a flowchart of a computer implemented method for expressing emotion in text message in accordance with one embodiment of the present invention. Referring to step 1210 of FIG. 12, a portion a textual message having greater emotional value is dynamically indicated. In embodiments of the present invention, a user creating a textual message (e.g., textual message 210 of FIG. 2) dynamically indicates a portion of the textual message having greater emotional value. Steps 1210*a*, and 1210*b* discuss in greater detail, a method for dynamically indicating a portion of a textual message in accordance with embodiments of the present invention.

In step 1210*a* of FIG. 12, a keyboard operable for detecting an amount of force exerted upon the keyboard is utilized. Some Musical Instrument Digital Interface (MIDI) compatible keyboards have the ability to sense the amount of pressure which is being applied to the keys while they are depressed. This pressure information, commonly called "aftertouch", may be used to control some aspects of the sound produced by a synthesizer (e.g., volume or vibrato). The keyboard sends separate data bytes to indicate which key has been depressed and the amount of pressure exerted upon it.

In embodiments of the present invention, a typing keyboard is similarly configured to detect the amount of pressure exerted upon it. Thus, depressing a key on a keyboard generates a signal indicating which key has been depressed, and the amount of force exerted upon the depressed key. The magnitude of the force exerted upon a key can be used to indicate a portion of textual message 210 which has greater emotional value than other parts of the message.

In step 1210*b* of FIG. 12, a key is depressed with a greater amount of force than required to register a typical key press to indicate the portion of the textual message having greater emotional value. Using a pressure sensitive keyboard, a user can exert a different amount of pressure upon the keyboard to emphasize a portion of a textual message (e.g., textual message 210 of FIG. 2) having greater emotional value. For example, a user can establish a baseline measurement to establish the amount of force which indicates a typical key press. When the user wants to emphasize a particular word, they exert a greater amount of pressure than the baseline measurement when typing the first letter of the word. This information is captured as text parameter information 213 which identifies this particular word as having greater emotional value.

Additionally, the user can exert varying amounts of pressure upon the keyboard to indicate a greater or lesser degree of intensity in text message 260. Using pre-configured parameter information, the text animation engine of the present invention visually emphasizes that word when animated text 260 is displayed. This method is advantageous because the user is not required to interrupt their composition of the message when indicating a portion of textual message 210 which has greater emotional value. Thus, the present invention provides a method for expressing emotion in a text message which is convenient and which facilitates expressing the intensity of the user's emotion as well.

Referring to again to FIG. 3 and to step 1220 of FIG. 12, animation processing of the textual message (e.g., textual message 210) is performed wherein the portion of the textual message indicated in steps 1210*a* and 1210*b* are visually emphasized in an animated text message (e.g., animated text 260 of FIG. 2). Animation plug-in 232 performs animation processing upon data from XML module 231 to create animated text message 260. In embodiments of the present invention, the attributes of the various sections of XML document 240 describe different animation effects for portions which are to be visually emphasized in animated text message 260 in order to indicate greater emotional value.

Figure 13:
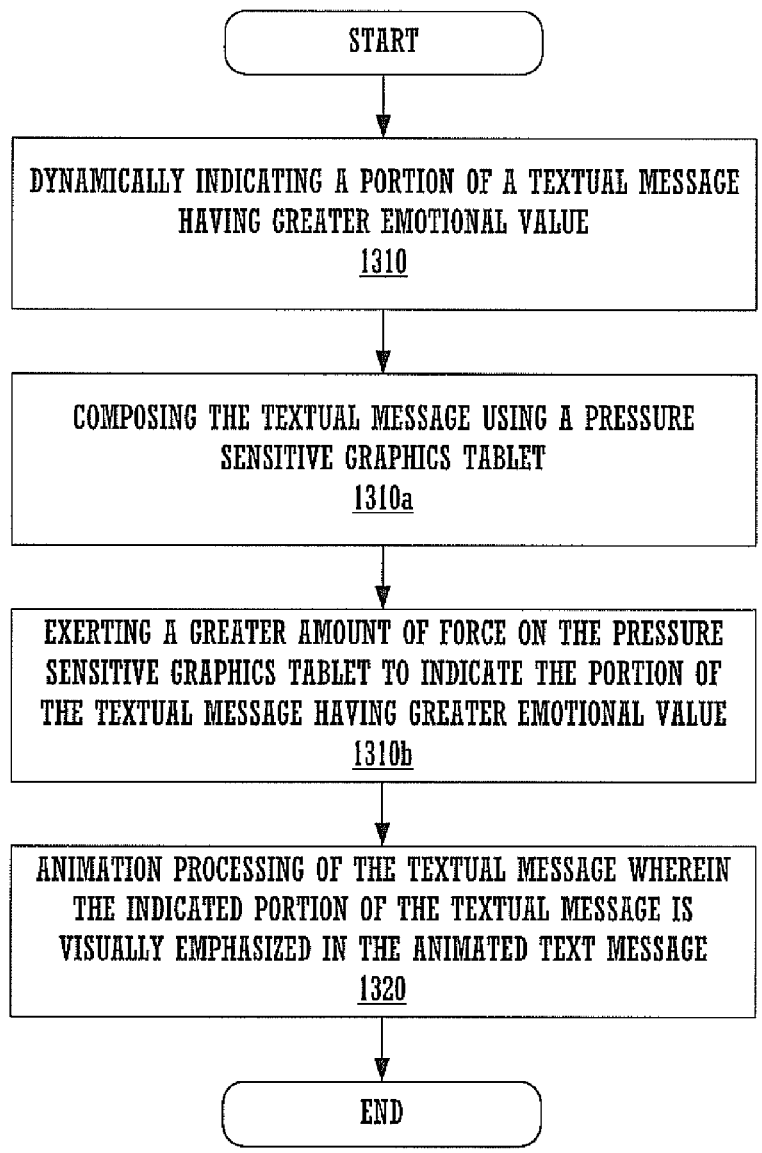
FIG. 13 is a flowchart of a method for expressing emotion in text message in accordance with one embodiment of the present invention.

FIG. 13 is a flowchart of a computer implemented method for expressing emotion in text message in accordance with one embodiment of the present invention. Referring to FIG. 2 and to step 1310 of FIG. 13, a portion a textual message having greater emotional value is dynamically indicated. In embodiments of the present invention, a user creating a textual message (e.g., textual message 210 of FIG. 2) dynamically indicates a portion of the textual message having greater emotional value. Steps 1310*a*, and 1310*b* discuss in greater detail, a method for dynamically indicating a portion of a textual message in-accordance with embodiments of the present invention.

In step 1310*a* of FIG. 13, a message is composed using a pressure sensitive graphics tablet. Currently, there are commercially available graphics tablets which are capable of detecting up to 1024 different levels of pressure exerted upon them. A user can utilize a stylus to write or draw on the graphics tablet and the images created by the user are stored as a file. By exerting different levels of pressure on the graphics tablet, the user can cause, the image to display different characteristics such as different colors, or different line weights. In accordance with embodiments of the present invention, text animation engine 230 can be configured to interpret a greater amount of force exerted upon a pressure sensitive graphics tablet as an indication of a portion of textual message 210 which has greater emotional value. Additionally, a user may exert a lesser amount of force than a default setting to indicate a portion of textual message that will be visually de-emphasized in animated text message 260.

In step 1310*b* of FIG. 13, a greater amount of force than that required to register an input is exerted on the pressure sensitive graphics tablet to indicate the portion of the textual message having greater emotional value. The user can establish a baseline measurement which establishes a default pressure level for inputting text characters. In accordance with embodiments of the present invention, while composing textual message 210, a user can exert different levels of force upon a pressure sensitive graphics tablet to indicate a portion of the message which has greater emotional value.

Referring to FIG. 3 and to step 1320 of FIG. 13, animation processing of the textual message (e.g., textual message 210) is performed wherein the portion of the textual message indicated in steps 1310*a*, and 1310*b* is visually emphasized in an animated text message (e.g., animated text 260 of FIG. 2). Animation plug-in 232 performs animation processing upon data from XML module 231 to create animated text message 260. In embodiments of the present invention, the attributes of the various sections of XML document 240 describe different animation effects for portions which are to be visually emphasized in animated text message 260 in order to indicate greater emotional value.

Figure 14:
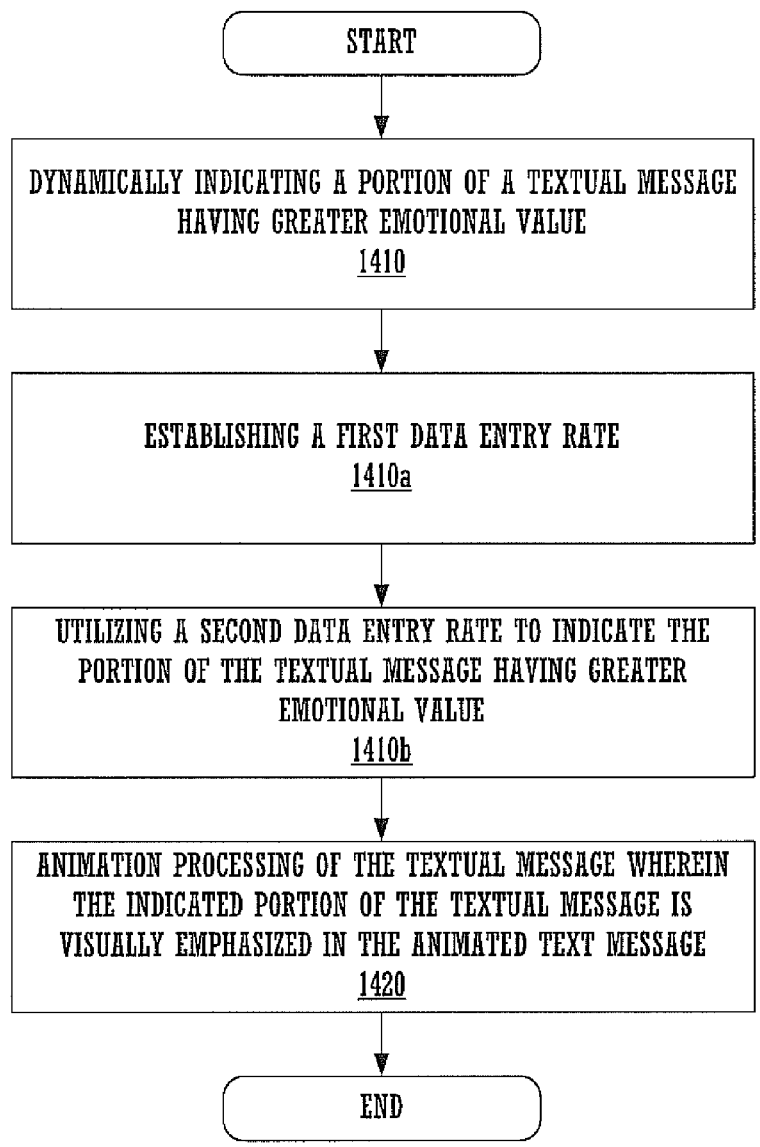
FIG. 14 is a flowchart of a method for expressing emotion in text message in accordance with one embodiment of the present invention.

FIG. 14 is a flowchart of a computer implemented method for expressing emotion in a text message in accordance with one embodiment of the present invention. Referring to FIG. 2 and to step 1410 of FIG. 14, a portion a textual message having greater emotional value is dynamically indicated. In embodiments of the present invention, a user creating a textual message (e.g., textual message 210 of FIG. 2) dynamically indicates a portion of the textual message having greater emotional value. Steps 1410*a*, and 1410*b* discuss in greater detail, a method for dynamically indicating a portion of a textual message in accordance with embodiments of the present invention.

In step 1410*a* of FIG. 14, a first data entry rate is established. A user's typing speed may also be used to indicate emotion or emphasis in embodiments of the present invention. For example, a user may type faster than normal when angry or excited. Thus, in embodiments of the present invention, a user can establish a baseline or "normal" typing rate which could be used by text animation engine 230 to indicate portions of textual message 210 which do not have greater emotional value.

In step 1410b of FIG. 14, a second data entry rate is utilized to indicate a portion of the textual message having a greater emotional value. In accordance with embodiments of the present invention, when a user is typing at a significantly faster rate than their baseline rate, text animation engine 230 can utilize this data rate information to indicate portions of textual message 210 which have greater emotional value to the user.

Referring to FIG. 3 and to step 1420 of FIG. 14, animation processing of the textual message (e.g., textual message 210) is performed wherein the portion of the textual message indicated in steps 1410a, and 1410b are visually emphasized in an animated text message (e.g., animated text 260 of FIG. 2). Animation plug-in 232 performs animation processing upon data from XML module 231 to create animated text message 260. In embodiments of the present invention, the attributes of the various sections of XML document 240 describe different animation effects for portions which are to be visually emphasized in animated text message 260 in order to indicate greater emotional value.

Figure 15A:
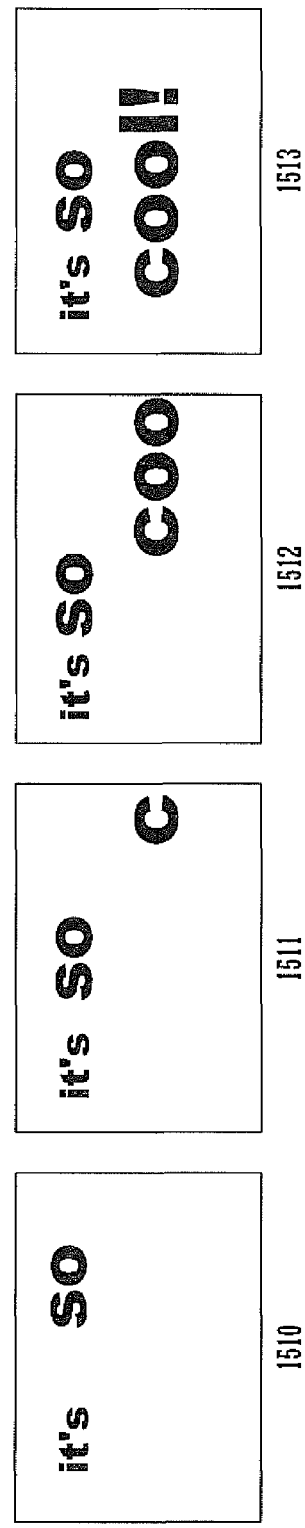
FIGS. 15A and 15B are sequences showing a text message animated in accordance with embodiments of the present invention.
Figure 15B:
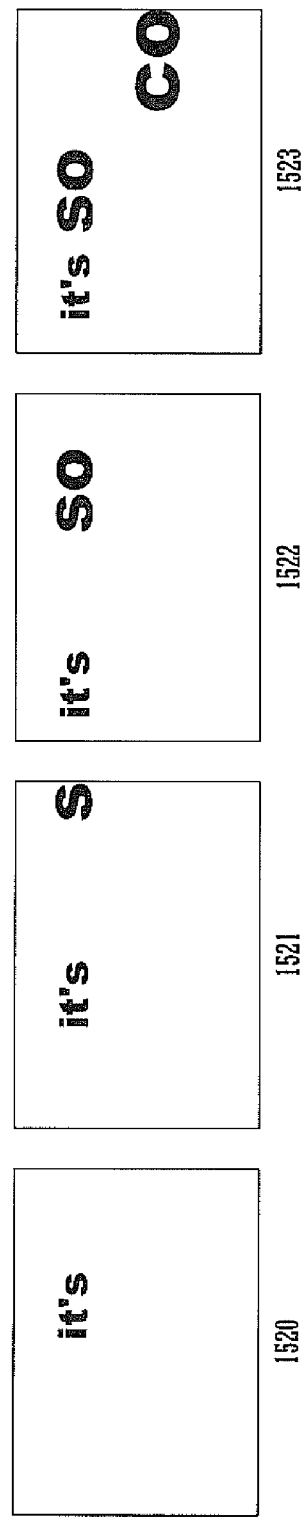

FIGS. 15A and 15B are sequences of exemplary screen shots showing a text message animated in accordance with embodiments of the present invention. In the embodiments of FIGS. 15A and 15B, different typing speeds are used when creating the textual message and result in different text animation speeds when the animated text message is displayed. For example, FIGS. 15A and 15B represent equivalent time intervals for displaying an animated text message, the sequence of screen shots of FIG. 15A display the phrase "it's so cool" much quicker than the series of screen shots of FIG. 15B. In one embodiment of the present invention, using a second data entry rate indicates a portion of a textual message having greater emotional value. Thus, FIG. 15B may represent an example of a message typed at a baseline or normal typing rate while FIG. 15A represents a message typed at a second or faster typing rate. Thus, the more rapid scrolling of text shown in FIG. 15A may indicate excitement, anger, or some other strong emotion, while the slower scrolling of text shown in FIG. 15B may indicate a lack of or a lesser degree of those emotions.

Figure 16:
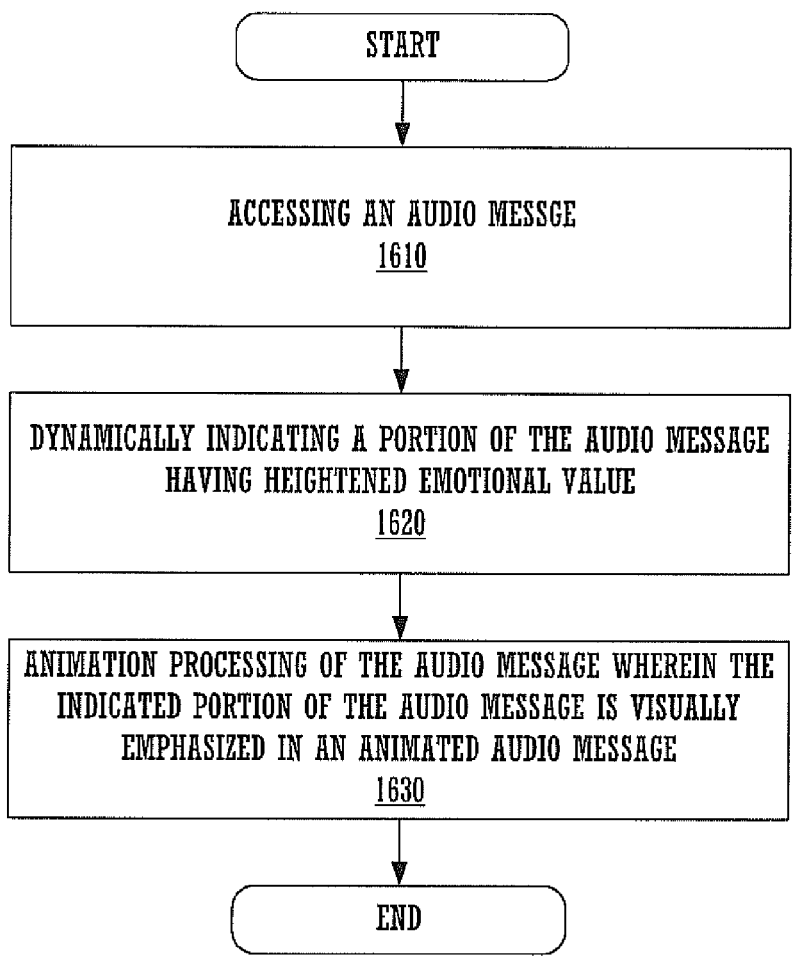
FIG. 16 is a flowchart of a method for expressing emotion in text message in accordance with one embodiment of the present invention.

FIG. 16 is a flowchart of a computer implemented method for indicating a portion of a textual message having greater emotional value in accordance with an embodiment of the present invention. In step 1610 of FIG. 16, an audio message is accessed. In accordance with embodiments of the present invention, an audio message (e.g., audio message 220 of FIG. 2) may comprise a spoken message, a previously recorded message, musical lyrics, television broadcasts, radio broadcasts, etc.

In step 1620 of FIG. 16, a portion of the audio message having greater emotional value is dynamically indicated. Referring again to FIG. 3, embodiments of the present invention are capable of indicating portions of audio message 220 which have greater emotional value. This may comprise portions of audio message 220 which are audibly louder than other portions of the message, or portions which are at an audible higher or lower pitch than other portions of audio message 220. In one embodiment of the present invention, different XML attributes are automatically assigned to portions of XML document 240 to indicate the portions of audio message 220 which have greater emotional value (e.g., audibly louder portions of audio message 220 and/or audibly higher or lower in pitch).

In step 1630 of FIG. 16, animation processing of the audio message is performed wherein the indicated portion of the audio message is visually emphasized in an animated text message. Referring again to FIG. 3, animation plug-in 232 processes information from XML module 231 to create animated text message 260. Portions of animated text message 260 are visually emphasized which correspond to the portions of audio message 220 which have greater emotional value.

Figure 17:
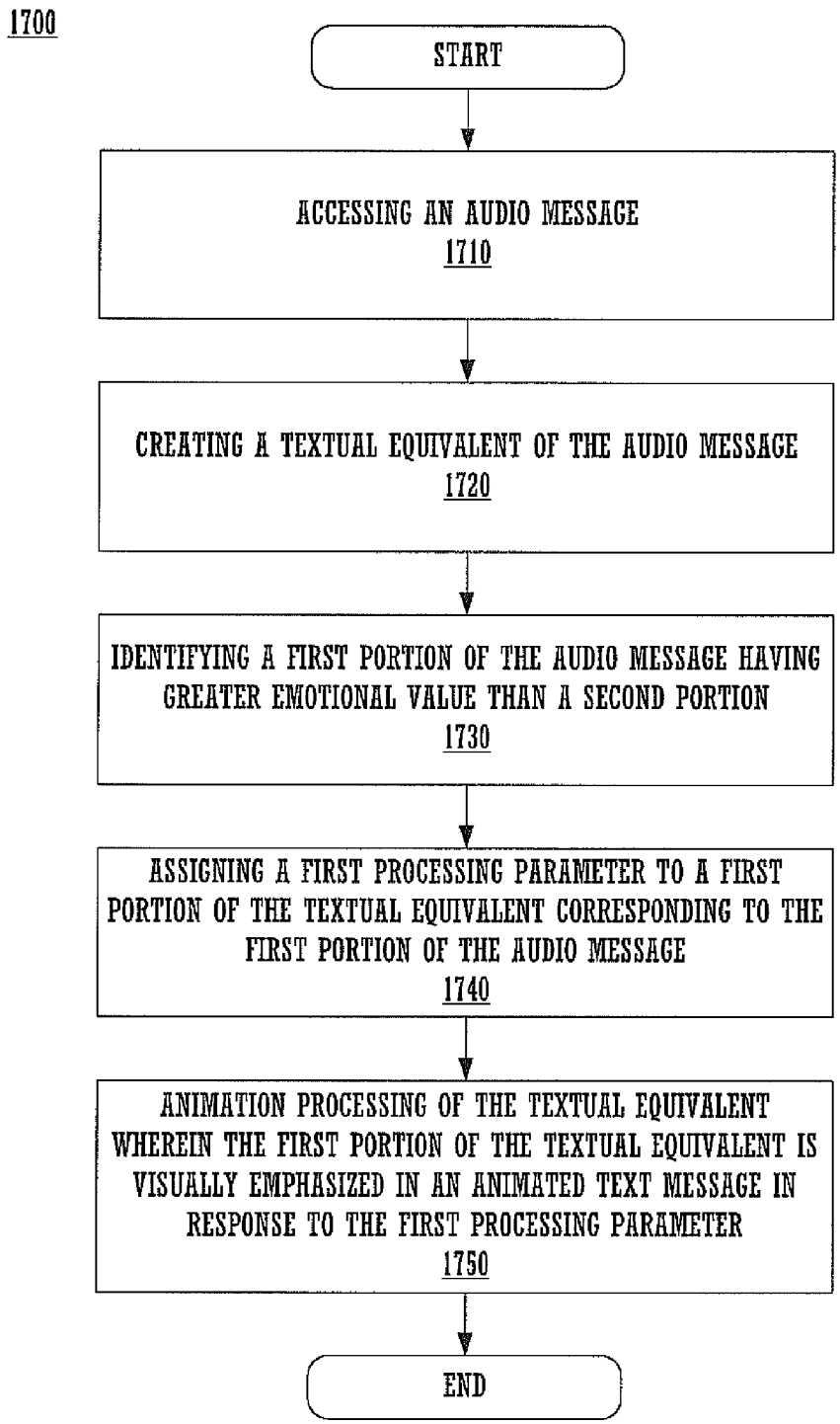
FIG. 17 is a flowchart of a method for indicating a portion of a textual message having heightened emotional value in accordance with an embodiment of the present invention.

FIG. 17 is a flowchart of a computer implemented method for indicating a portion of a textual message having heightened emotional value in accordance with an embodiment of the present invention. In step 1710 of FIG. 17, an audio message is accessed. Referring again to FIG. 3, audio message 220 is received by audio plug-in 221. In accordance with embodiments of the present invention, audio message 220 can be a spoken message, or another audio message such as a movie, television broadcast, or music.

In step 1720 of FIG. 17, a textual equivalent of the audio message is created. In embodiments of the present invention, textual content 223 is created by voice recognition module 222 and is a transcription of audio message 220. In embodiments of the present invention, XML module uses textual content 223 as the content of XML document 240. Thus, in embodiments of the present invention, XML document 240 is a textual equivalent of audio message 220.

In step 1730 of FIG. 17, a first portion of the audio message having greater emotional value is identified. In embodiments of the present invention, volume/pitch information 224 identifies portions of audio message 220 having greater emotional value. For example, volume/pitch information 224 may identify portions of audio message 224 which are audibly louder than another portion of audio message 220 and identify that portion as having greater emotional value. Additionally, volume/pitch information 224 may identify portions of audio message 220 which are spoken at an audibly higher or lower pitch than another portion of audio message 220 and identify that portion as having greater emotional value.

In step 1740 of FIG. 17, a first processing parameter is assigned to a first portion of the textual equivalent corresponding to the first portion of the audio message. In accordance with embodiments of the present invention, XML module 231 uses animation parameters 233 to assign processing parameters to a portion of XML document 240 which corresponds to the portion of audio message 220 which is identified as having greater emotional value. For example, XML module 231 appends different XML or SVG attributes to each section of XML document 240 which is identified as having greater emotional value.

In step 1750 of FIG. 17, animation processing of the textual equivalent is performed wherein the first portion of the textual equivalent is visually emphasized in an animated text message in response to the first processing parameter. In embodiments of the present invention, text animation engine 230 further comprises an animation plug-in 232 which converts data from XML module 231 into animated text message 260. This converting may be performed by a recipient of XML document 240, or by the user who created audio message 220. Thus, a user may pre-view animated text message 260 before sending XML document 240 to a recipient. Additionally, in embodiments of the present invention, text animation engine 230 is well suited for sending a document (e.g., document 270 of FIG. 2) in a different format (e.g., Macromedia Flash, Macromedia Director, Java, JavaScript, Adobe Aftereffects, Adobe Premier, C++, etc) if a recipient's computer is not configured with a text animation engine (e.g., text animation engine 2 250 and of FIG. 2).

Embodiments of the present invention are also well suited to be used upon handheld electrical devices such as Personal Digital Assistants (PDAs) and cellular telephones. For example, a PDA can utilize a pressure sensitive graphics tablet, as described in the discussion of FIG. 10, as a handwriting recognition area. While writing textual message 210 on the PDA, a user can dynamically indicate portions of textual message 210 by exerting greater pressure upon the graphics tablet. If the user's PDA is not equipped with a pressure sensitive graphics tablet, the user can utilize an interface displayed upon the PDA which simulates a typing keyboard and use a stylus to depress the "keys" on the display. The user can then indicate portions of textual message 210 which have greater emotional value by depressing a key for a longer period in a manner similar to that of method 1000 of FIG. 10.

Figure 18:
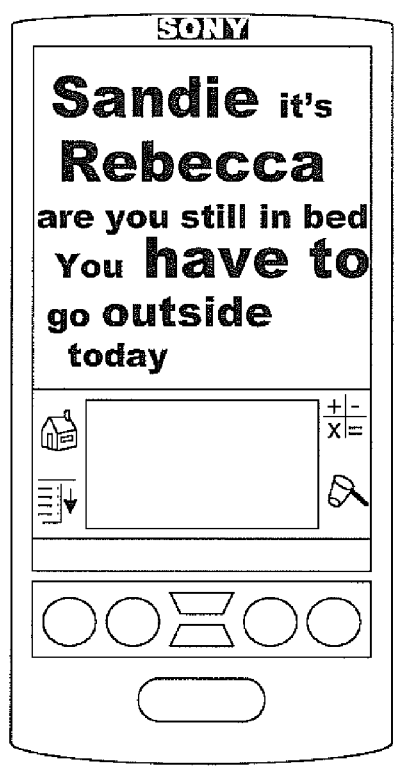
FIG. 18 shows an exemplary handheld wireless device displaying a message in which portions are visually emphasized in accordance with embodiments of the present invention.

The present invention is also well suited for use on cellular telephones or other portable wireless devices. For example, FIG. 18 shows an exemplary portable wireless device displaying a message in which portions are visually emphasized in accordance with embodiments of the present invention. Many PDAs enable a user to browse the World Wide Web via a Web portal. Using an embodiment of the present invention, a cellular provider or Web portal can offer text animation as a service for subscribers. A user could access a server which stores messages which will be displayed on their portable wireless device as animated text messages (e.g., animated text message 260 of FIG. 2). In one embodiment, a media viewer, which can either run as an embedded application or downloaded onto the portable wireless device, is used to display animated text message 260.

As an example, in Japan NTT DoCoMo delivers a service called i-mode which allows users to browse the world wide web. NTT DoCoMo has the i-mode information network through which subscribers can access a web page by entering in the web page's address. One service provided by NTT DoCoMo allows loading Java applications wirelessly to portable devices so that users can access various applications without having to store them on their devices. One application which can be used in accordance with embodiments of the present invention is the Plazmic Media Engine™. The Plazmic Media Engine™ is a downloadable media player which renders interactive and animated graphics from Scalable Vector Graphics (SVG) compliant documents which utilize one form of XML.

Figure 19:
FIG. 19 shows another exemplary handheld wireless device displaying a message in which portions are visually emphasized in accordance with embodiments of the present invention.

FIG. 19 shows an exemplary cellular telephone displaying a message in which portions are visually emphasized in accordance with embodiments of the present invention. Embodiments of the present invention are advantageous for displaying textual messages upon devices having small display interfaces because a user can view an message without having to scroll down to view the entire message. For example, if displaying a large message, animation parameters 233 may include removing portions of the textual message after a period of time to allow displaying additional portions of the textual message. In prior art implementations, if a message exceeded a certain length, it could not be displayed in its entirety upon devices having limited screen space (e.g., cellular telephones and wireless PDAs). A user had to scroll down to view the portions of the message that were not currently being displayed.

Figure 20A:
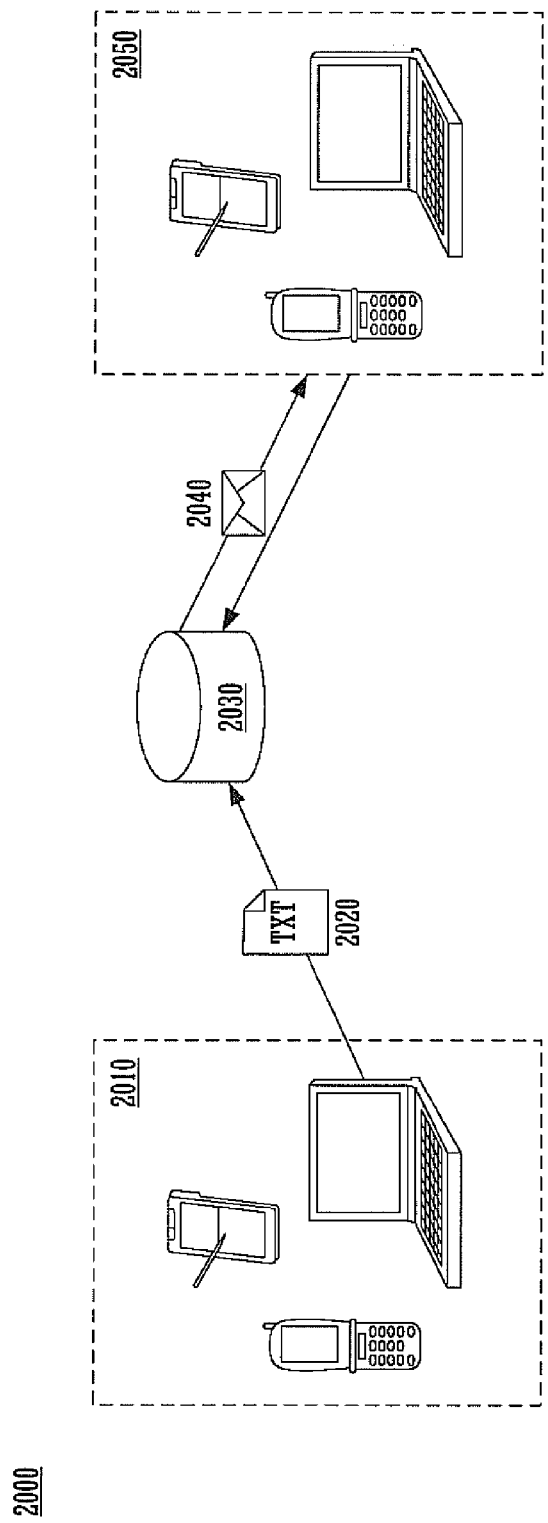
FIGS. 20A and 20B show implementations for displaying animated text messages upon handheld wireless devices and personal computers in accordance with embodiments of the present invention.
Figure 20B:
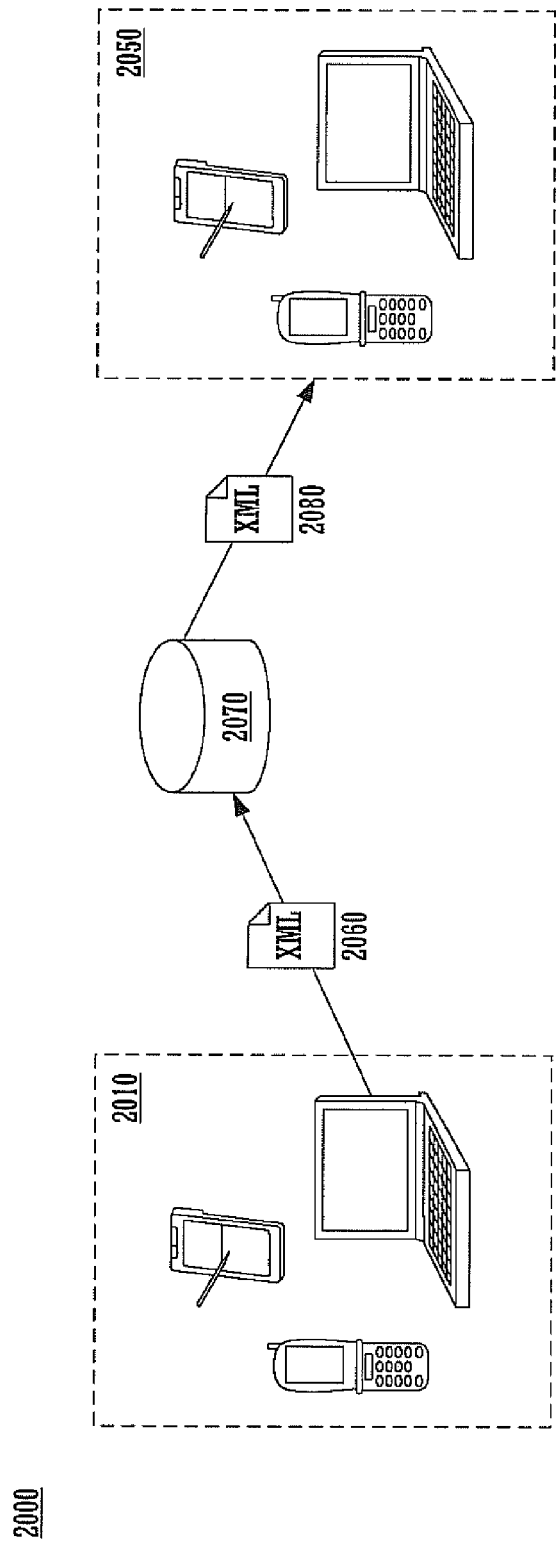

FIGS. 20A and 20B show implementations for displaying animated text messages upon handheld wireless devices in accordance with embodiments of the present invention. In FIG. 20A, a user 2010 sends a message 2020 to a server 2030. A service provider (e.g., an Internet service provider, cellular provider, or Web portal) can provide a subscription service which allows subscribers to view animated text messages.

In one embodiment, a user sends a text message to server 2030 and may manually indicate portions of message 2020 having greater emotional value while it is resident on server 2030. In another embodiment, user 2010 sends a voice message which is stored upon server 2030. The subscription service can convert the voice message into a textual equivalent (e.g., using audio plug-in 221 of FIG. 2) and automatically indicate portions of the textual equivalent that have greater emotional value (e.g., using audio plug-in 221 of FIG. 2).

In the embodiment of FIG. 20A, server 2030 sends a new mail notification 2040 to recipient 2050. Recipient 2050 connects to server 2030 to browse the animated text message stored upon server 2030. In FIG. 20A, recipient 2050 can be a handheld wireless device such as a cellular telephone of internet enabled PDA. In embodiments of the present invention, a media viewer is used to display the animated text message and can be run as an embedded application on the wireless device or downloaded onto the device from the service provider.

In embodiments of the present invention, user 2010 and recipient 2050 can connect to server 2030 wirelessly using, for example, a cellular telephone or internet enabled PDA. Alternatively, user 2010 and recipients 2050 can connect to server 2030 with a computer having an internet connection (e.g., high speed internet or dial-up connection).

In the embodiment of FIG. 20B, user 2010 sends an XML message 2060 to server 2070. XML message 2060 is a message that has been configured in accordance with embodiments of the present invention (e.g., XML document 240 of FIG. 2). In other words, user 2010 has indicated portions of a textual message that have heightened emotional value and, using text animation engine 230, XML message 2060 has been created. In XML message 2060, the indicated portions of the user's original message having heightened emotional value are identified using appended XML tags that define different attributes for those portions. The appended XML tags can convey information for causing those portions of XML message 2060 to be rendered differently than other portions of the message.

Thus, embodiments of the present invention can create messages (e.g., XML document 240 of FIG. 2) which can be displayed on wireless portable devices as animated text messages (e.g., animated text message 260 of FIG. 2) in which portions having greater emotional value are visually emphasized.

The preferred embodiment of the present invention, a method for expressing emotion in a text message, is thus described. While the present invention has been described in particular embodiments, it should be appreciated that the present invention should not be construed as limited by such embodiments, but rather construed according to the following claims.

What is claimed is:

1. A method for expressing emotion comprising:
   accessing an input audio message for translation into a text format; and
   processing said input audio message to determine a portion of said input audio message having heightened emotional value, and wherein said processing is operable to create a textual equivalent of said input audio message as an animated text message, wherein said determined portion of said input audio message is visually emphasized in said animated text message.

2. The method as described in claim 1, further comprising visually de-emphasizing a portion of said animated text message which has not been determined as having heightened emotional value.

3. The method as described in claim 1, wherein said processing said input audio message to determine said portion of said input audio message having heightened emotional value further comprises identifying a portion of said input audio message which is audibly louder than another portion of said spoken message.

4. The method as described in claim 3, wherein a spectrum analysis is used to identify said portion of said input audio message that is audibly louder.

5. The method as described in claim 1, wherein said processing said input audio message to determine said portion of said input audio message having heightened emotional value further comprises identifying a portion of said input audio message having heightened emotional value and wherein said determined portion is at an audibly higher pitch than another portion of said spoken message.

6. The method as described in claim 5, wherein a spectrum analysis is used to identify said portion of said input audio message at an audibly higher pitch.

7. The method as described in claim 5, wherein said processing said input audio message to determine said portion of said input audio message having heightened emotional value further comprises identifying a portion of said input audio message having heightened emotional value and wherein said determined portion is at an audibly lower pitch than another portion of said spoken message.

8. The method as described in claim 7, further comprising visually de-emphasizing a portion of said animated text message which has not been determined as having heightened emotional value.

9. The method as described in claim 1, further comprising concurrently accessing a portion of said input audio message while a corresponding portion of said animated text message is displayed.

10. The method as described in claim 1, wherein said animated text message is operable to express varying levels of emphasis.

11. The method as described in claim 1, wherein said processing said input audio message to determine said portion of said input audio message having heightened emotional value comprises:
   appending a plurality of Extensible Markup Language (XML) attributes operable to identify portions of said input audio message having heightened emotional value.

12. The method as described in claim 11, wherein said plurality of XML attributes are derived from a plurality of animation parameters, and wherein said plurality of animation parameters comprises a plurality of default values and a plurality of user defined values.

13. The method as described in claim 12, wherein said plurality of user defined values is configuration parameters operable to customize said animated text message operable to express varying levels of emphasis.

14. A method for adding visual emphasis comprising:
   accessing an input audio message for translation in to a text format;
   creating a textual equivalent of said input audio message;
   determining a first portion of said input audio message having greater emotional value than a second portion of said input audio message;
   assigning a first processing parameter to a first portion of said textual equivalent corresponding to said first portion of said input audio message; and
   processing of said textual equivalent wherein said first portion of said textual equivalent is visually emphasized in an animated text message in response to said first processing parameter.

15. The method as described in claim 14 further comprising:
   assigning a second processing parameter to a second portion of said textual equivalent corresponding to said second portion of said input audio message; and
   visually de-emphasizing said second portion of said textual equivalent in said animated text message in response to said second processing parameter.

16. The method as described in claim 14, wherein said determining of said first portion of said input audio message comprises identifying a portion of said input audio message which is audibly louder than another portion of said spoken message.

17. The method as described in claim 16, wherein said identifying of said first portion of said input audio message further comprises identifying a portion of said input audio message which is at an audibly higher pitch than another portion of said spoken message.

18. The method as described in claim 17, wherein said identifying of said first portion of said input audio message further comprises identifying a portion of said input audio message which is at an audibly lower pitch than another portion of said spoken message.

19. The method as described in claim 14, further comprising concurrently accessing a portion of said input audio message while a corresponding portion of said animated text message is displayed.

20. The method as described in claim 14, wherein said creating a textual equivalent of said input audio message comprises creating a document compliant with a version of the Extensible Markup Language (XML).

21. A computer-useable medium having computer-readable program code stored thereon for causing a computer system to execute a method for expressing emotion comprising:
   accessing an input audio message for translation in to a text format; and
   processing said input audio message to determine a portion of said input audio message having heightened emotional value, and wherein said processing is operable to create a textual equivalent of said input audio message as an animated text message, wherein said determined portion of said input audio message is visually emphasized in said animated text message.

22. The computer-useable medium as described in claim 21, further comprising visually de-emphasizing a portion of said animated text message which has not been determined as having heightened emotional value.

23. The computer-useable medium as described in claim 21, wherein said processing said input audio message to determine a portion of said input audio message having heightened emotional value further comprises identifying a portion of said input audio message which is audibly louder than another portion of said spoken message.

24. The computer-useable medium as described in claim 21, wherein said processing said input audio message to determine a portion of said input audio message having heightened emotional value further comprises identifying a portion of said input audio message having heightened emotional value and wherein said indicated portion is at an audibly higher pitch than another portion of said spoken message.

25. The computer-useable medium as described in claim 24, wherein said processing said input audio message to determine a portion of said input audio message having heightened emotional value further comprises identifying a portion of said input audio message having heightened emotional value and wherein said indicated portion is at an audibly lower pitch than another portion of said spoken message.

26. The computer-useable medium as described in claim 25, further comprising visually de-emphasizing a portion of said animated text message which has not been determined as having heightened emotional value.

27. The computer-useable medium as described in claim 21, further comprising concurrently accessing a portion of said input audio message while a corresponding portion of said animated text message is displayed.

* * * * *